US006728730B1

(12) United States Patent
Muro et al.

(10) Patent No.: US 6,728,730 B1
(45) Date of Patent: Apr. 27, 2004

(54) FIGURE MANAGEMENT SYSTEM AND FIGURE MODIFYING METHOD BY USING FIGURE MANAGEMENT SYSTEM

(75) Inventors: Keiro Muro, Higashikurume (JP); Nobuhiro Ishimaru, Kawasaki (JP); Kazuaki Iwamura, Tanashi (JP); Kazuo Tsutsui, Hitachiota (JP)

(73) Assignee: Hitachi, Ltd., Tokyo (JP)

( * ) Notice: Subject to any disclaimer, the term of this patent is extended or adjusted under 35 U.S.C. 154(b) by 495 days.

(21) Appl. No.: 09/634,543

(22) Filed: Aug. 8, 2000

(30) Foreign Application Priority Data

Aug. 10, 1999 (JP) ............................................ 11-225887

(51) Int. Cl.[7] .............................................. G06F 17/30
(52) U.S. Cl. ........................ 707/104.1; 707/10; 345/441
(58) Field of Search ...................... 707/3, 6, 100–104.1, 707/10, 5; 345/619, 423, 441

(56) References Cited

U.S. PATENT DOCUMENTS

| 5,528,518 | A | * | 6/1996 | Bradshaw et al. ........... 702/150 |
| 5,546,107 | A | * | 8/1996 | Deretsky et al. .......... 707/104.1 |
| 5,893,113 | A | * | 4/1999 | McGrath et al. ............. 707/200 |
| 6,038,337 | A | * | 3/2000 | Lawrence et al. ........... 382/156 |
| 6,083,353 | A | * | 7/2000 | Alexander, Jr. ............. 202/158 |
| 6,188,776 | B1 | * | 2/2001 | Covell et al. ................ 382/100 |
| 6,247,019 | B1 | * | 6/2001 | Davies .................... 707/103 R |
| 6,400,853 | B1 | * | 6/2002 | Shiiyama ..................... 382/305 |

* cited by examiner

*Primary Examiner*—John Breene
*Assistant Examiner*—Mohammad Ali
(74) *Attorney, Agent, or Firm*—Antonelli, Terry, Stout & Kraus, LLP

(57) ABSTRACT

A figure management system in which plural kinds of figures concerning the same part to be managed are modified. The figure management system includes a figure DB for storing data of figures including topological figures, an attribute DB for storing object attribute data, input and output devices, and a computer for managing figure and object attribute data. An ID code common to features indicating the same object is assigned. On input of a new figure, feature-attribute matching is performed between a feature having no ID code on the new figure and existent object attribute data. If any inconsistency is found the feature is indicated as a discrepant feature or a renewed feature.

26 Claims, 17 Drawing Sheets

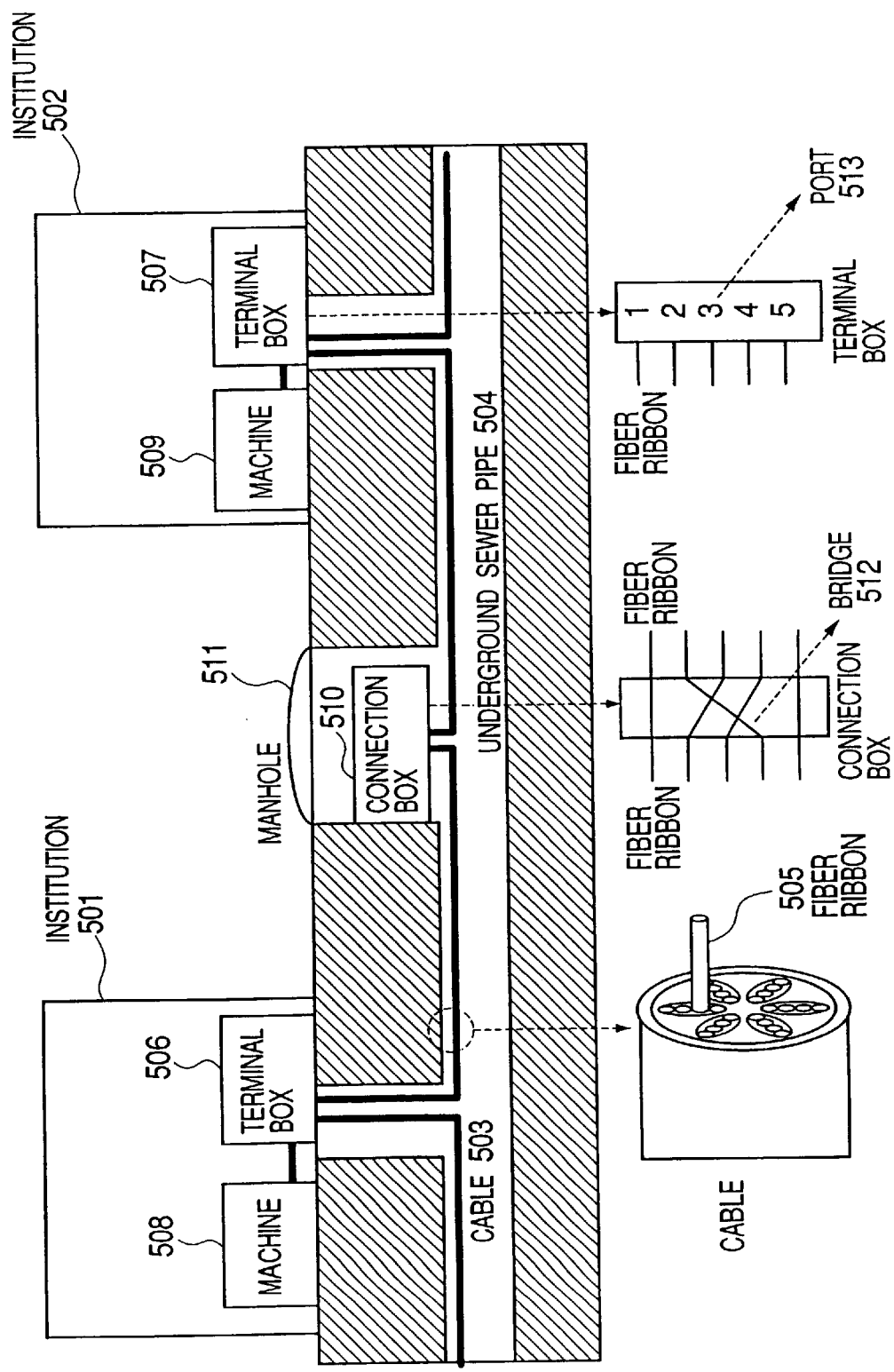

FIG. 7
GEOGRAPHIC MAP (SCALE 1/500) 702
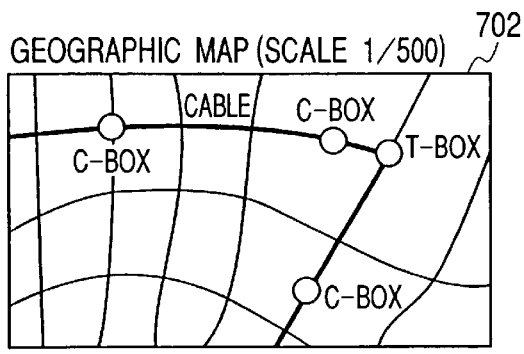
METADATA 703
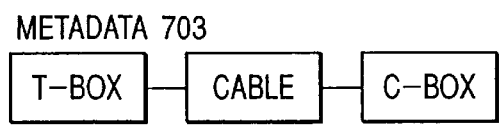
NETWORK TOPOLOGY FIGURE 704
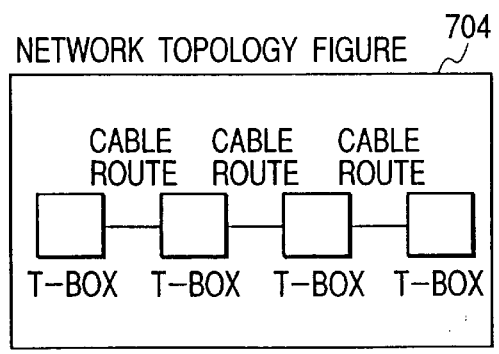
METADATA 705
MACHINE CONNECTION FIGURE 706
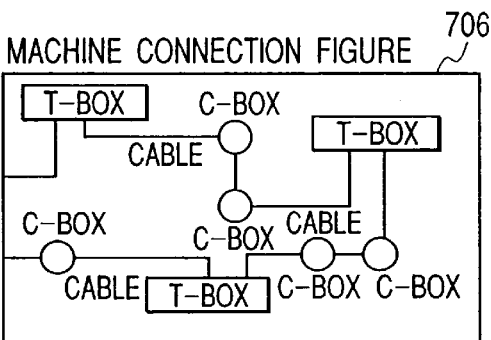
METADATA 707
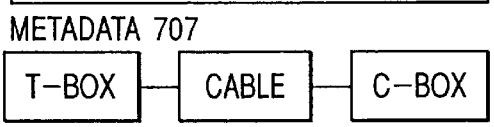
FIBER RIBBON CONNECTION FIGURE 708
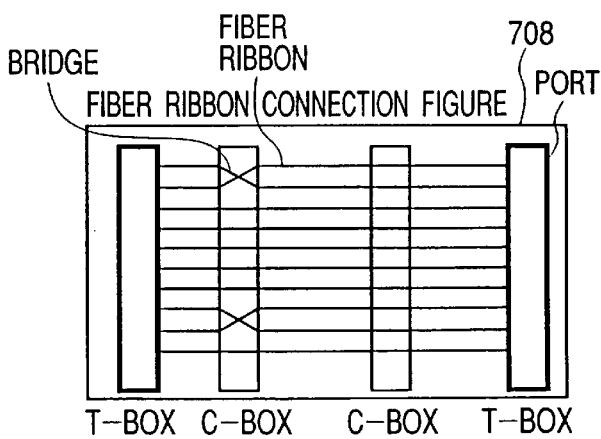
METADATA 709
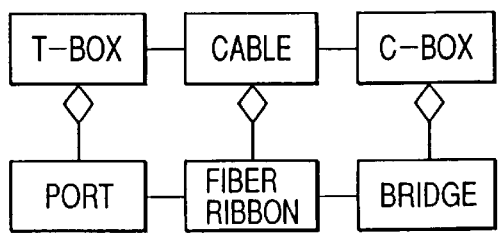

FIG. 10
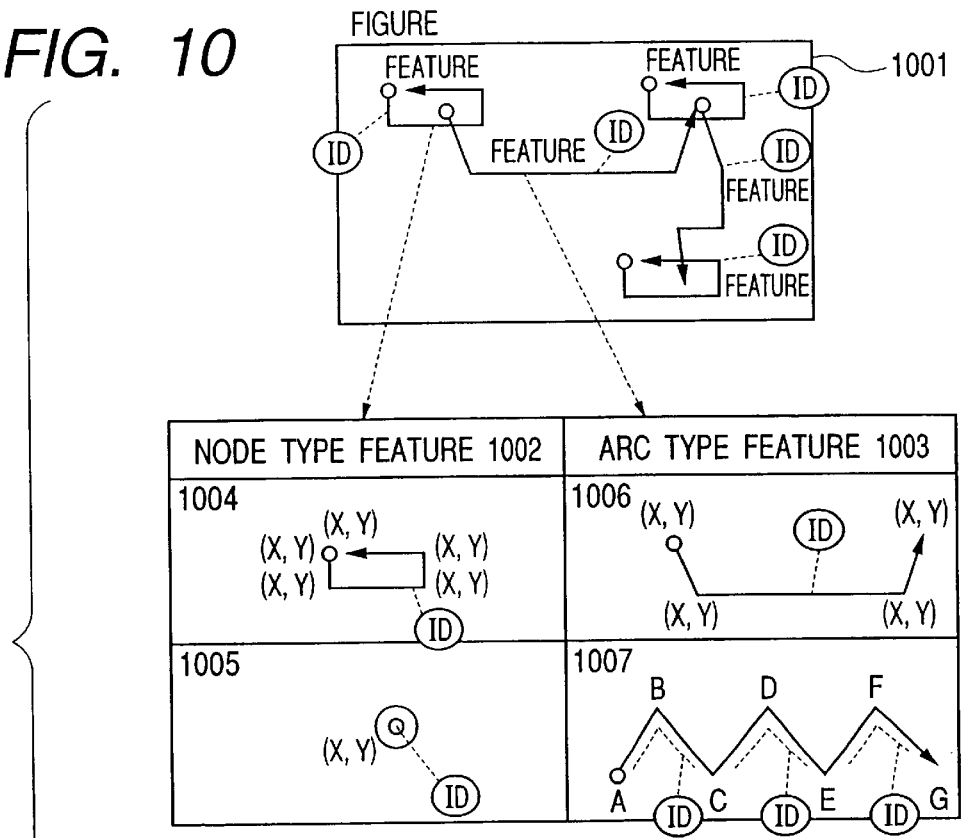
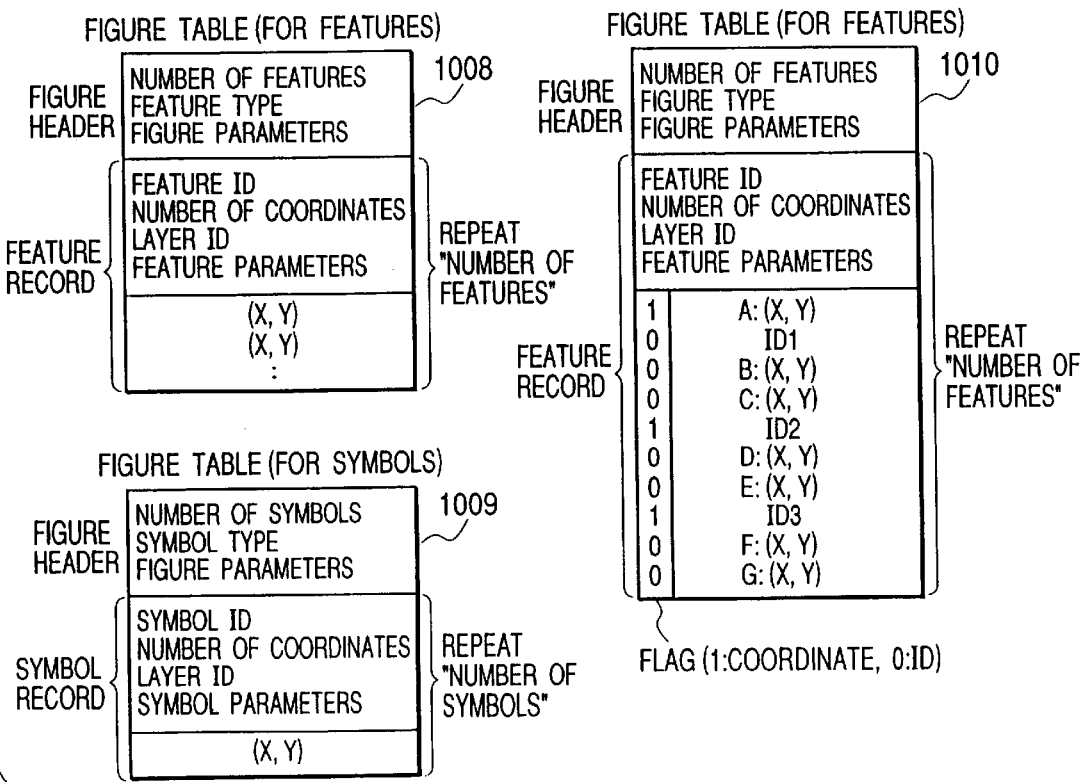

FIG. 12
| RULE OF CONNECTION BETWEEN ARCS | 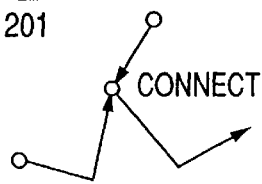 |
| --- | --- |
| RULE OF CONNECTION BETWEEN NODE AND ARC | 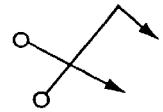 |
| RULE OF CONNECTION OF 2 ARCS AND 1 NODE | 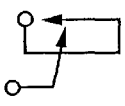 |

AUTOMATICALLY GENERATED FIGURE

FIGURE MANAGEMENT SYSTEM AND FIGURE MODIFYING METHOD BY USING FIGURE MANAGEMENT SYSTEM

BACKGROUND OF THE INVENTION

1. Field of the Invention

The present invention relates to a figure management system and a figure modifying method using the same. More particularly, the invention pertains to a method of making cross reference among a plurality of related figures and enabling efficient utilization of common objects repetitively appearing on the plural related figures, attributes of the common objects, network connections, etc. in a multiple-figure management system or a facility management system based on use thereof, such as a geographic information system (GIS) or a computer-aided design system (CAD), and further the invention is concerned with a figure management system for modifying a plurality of related figures while maintaining mutual consistency through detection of any possible discrepancy among the plural related figures and a figure modifying method using the same.

2. Description of the Related Art

Recent years have seen the increasing prevalence of geographic information systems (GIS) developed for providing electronic forms of paper-medium maps. In the GIS, geographic map figures are stored and processed in a computer thereof for managing names and attributes of various objects indicated by graphic features on figures, road connection networks, and other relational data of graphic features.

The GIS allows a user to make a search for a map of a desired geographic region and to look up detailed attribute data of an object represented by a corresponding on-map feature through selection thereof. Having various functions and means for managing, retrieving and processing geographic map figures and object attribute data, the GIS is capable of supporting facility management activities or urban planning activities for a local government, for example. International standardization concerning various functions of GIS is currently under way at the ISO/TC211 and Open GIS Consortium.

Referring to FIG. 16, there is shown a representative model of a conventional GIS used for figure management. In this system, geographic map figures are stored and managed in a figure database (DB) thereof, and attribute data of objects represented by graphic features on figures are stored and managed in an attribute DB thereof. Attributes of each object include such inherent data thereof as a name, a category, a superintendent, a date of construction (year, month, day), etc. For association between graphic features and object attributes, an ID code is assigned to each graphic feature, and attribute data corresponding to each assigned ID code is stored into the attribute DB. Thus, in this system, a user can make reference to attribute data by selecting a corresponding graphic feature on a figure.

Referring to FIG. 17, there is shown a configuration of a conventional GIS based on the Simple Feature Specifications proposed by the Open GIS Consortium. In this system, geographic map figures themselves are not subjected to management. Objects are handled using an attribute DB only. In addition to such attribute data of objects as categories (e.g., houses, roads, crossroads), names, superintendents, dates of construction (year, month, day), etc., graphic feature data thereof are managed through the use of the attribute DB. When it becomes necessary to prepare new figures, they can be generated using a set of graphic feature data.

SUMMARY OF THE INVENTION

In conventional GIS's, object attributes and on-figure graphic features are associated in a one-to-one correspondence. In actuality, however, maps and figures are prepared by partially mapping actual object relationships according to rules predetermined to meet a particular purpose of application, and plural kinds of figures such as $\frac{1}{500}$-scale maps, $\frac{1}{2500}$-scale maps, and topological figures may be used. For carrying out facility management activities, it is required to handle various kinds of figures concerning a single part to be managed. In the conventional GIS's, integrated management is not allowed concerning relationships between plural figures and actual objects.

More specifically, in preparation of a map meeting a particular purpose of application, it may be required to use figures having different scales, such as $\frac{1}{500}$-scale maps showing detailed geographic information and $\frac{1}{2500}$-scale maps showing overall geographic information. Further, the use of plural kinds of projection figures such as Mercator projection figures and Lambert projection figures may be required in some cases.

Still further, network topological figures in which object positions are rearranged for easy understanding of object connection relationships, such as electric-car line route diagrams and electric circuit diagrams, may be used. These network topological figures are prepared in a variety of forms according to presentation ranges, object representations, kinds of omitted objects, and other conditions concerning viewpoints of respective system users. A sketch map for location or road guide may also be regarded as a kind of topological figure.

Further, even among figures of the same kind, there are a multiplicity of variations, including modified figures, unmodified figures, figures prepared by different cartographers, figures prepared using different facility management systems, etc.

In operation of the conventional GIS's, a particular problem exists in that the cost of maintenance for modifying or updating figures is rather high. That is to say, at the time of maintenance of figures, a human operator searches the GIS for relevant figures and modifies them as required. Since the figures are modified by each human operator, errors or omissions may occur in modification to impair consistency among figures, resulting in a substantial increase in the cost of figure maintenance.

SUMMARY OF THE INVENTION

It is therefore an object of the present invention to provide a figure modifying method for use in a figure management system in which plural kinds of figures and attribute data are processed for the same part to be managed, the figure management method being so arranged as to reduce the cost of maintenance of figure management and to eliminate possible discrepancy among a plurality of figures including topological figures and possible discrepancy between figures and object attributes for maintaining overall system consistency at the time of figure modification.

In accomplishing this object of the present invention and according to one aspect thereof, there is provided a figure modifying method for use in a figure management system which has a figure DB for storing data of plural kinds of figures including topological figures concerning the same part to be managed, an attribute DB for storing attribute data of objects represented by graphic features on the figures, input and output devices for inputting and outputting figure data and attribute data, and a signal processing apparatus for managing figure data and attribute data through use of the figure DB, the attribute DB and the input and output devices, the figure modifying method being arranged for entering new figure data and for modifying a part of existent figure data stored in the figure DB, wherein, at the time of modification of any figure data, an absolute position of each object represented by an on-figure graphic feature and at least one of connection-association relationships thereof with other objects are compared with existent object attribute data indicating object absolute positions and connection-association relationships with other objects which are contained in the attribute DB, wherein an ID code common to the existent object attribute data contained in the attribute DB is assigned to each matched graphic feature for establishing a relationship, and wherein any graphic feature not matched with the existent object attribute data stored in the attribute DB is output onto an output device of the figure management system ask discrepant point or as a point to be renewed, and then correction is performed on the discrepant point or the point to be renewed through manual operation or by a feature-attribute automatic matching function of the signal processing apparatus of the figure management system.

Further, according to another aspect of the present invention, when any graphic feature is judged to be a discrepant point or a point to be renewed, a corresponding object attribute is modified by an attribute automatic modifying function included in the signal processing apparatus of the figure management system. To be more specific, a newly added object is registered, an attribute of a deleted object and an attribute of an object whose connection relationship or position has been changed are modified, and an attribute of an object in relation thereto is modified according to the attribute modification thus made.

In the above processing, plural kinds of figures including topological figures are applicable. Addition of a new figure and partial correction of an existent figure are also allowed in modification.

Still further, according to another aspect of the present invention, there is provided a figure management system in which the above-mentioned figure modifying method is to be implemented. The figure management system comprises a first processing section and a second processing section. In an arrangement wherein the figure DB for storing plural kinds of figure data concerning the same part to managed, the attribute DB for storing attribute data of objects represented by graphic features on figures, and the input and output devices for inputting and outputting the figure data and attribute data are interconnected, the first processing section is used to carry out correction on a discrepant point or a point to be renewed through manual operation or by the feature-attribute automatic matching function of the signal processing apparatus, and the second processing section is used to implement the attribute automatic modifying function thereof.

In a preferred embodiment of the present invention, the signal processing apparatus is embodied as a computer, and the first and second processing sections are realized by using information storage media containing application programs for executing respective functions.

According to the present invention, even in a situation where topological figures and different kinds of maps, e.g., maps based on different scales, maps based on different projection-methods, etc. are used mixedly, the following advantages are provided:

(1) At the time of figure modification, in case that entire replacement is made with external figures having no ID codes, an ID code can be assigned to each feature on figures efficiently using a proper combination of manual operation and the feature-attribute automatic matching function of the signal processing apparatus.

(2) When any feature on a figure sheet is edited and modified, a corresponding feature on a related figure is referenced and recorded as a candidate feature for automatic modification on the computer.

(3) When a plurality of related figures are given, any possible discrepancy in positions or connection relationships of objects indicated by features on respective figures can be found and corrected with ease.

These and other objects, features and advantages of the present invention will become more apparent in view of the following detailed description of the preferred embodiments in conjunction with accompanying drawings.

BRIEF DESCRIPTION OF THE DRAWINGS

FIG. 5 is a diagram showing a structure of a wide area network (WAN) managed by a geographic information system;

FIG. 7 is an explanatory diagram showing a group of figures handled for management of the WAN shown in FIG. 5;

FIG. 10 is a diagrammatic illustration for explaining figure storage arrangements and feature-attribute matching in a preferred embodiment of the figure management system according to the present invention;

FIG. 12 is a diagrammatic illustration for explaining how feature connection relationships are extracted from features on figures in a preferred embodiment of the figure modifying method used in the figure management system according to the present invention;

DESCRIPTION OF THE PREFERRED EMBODIMENTS

The present invention will now be described in detail by way of example with reference to the accompanying drawings.

Figure 1:
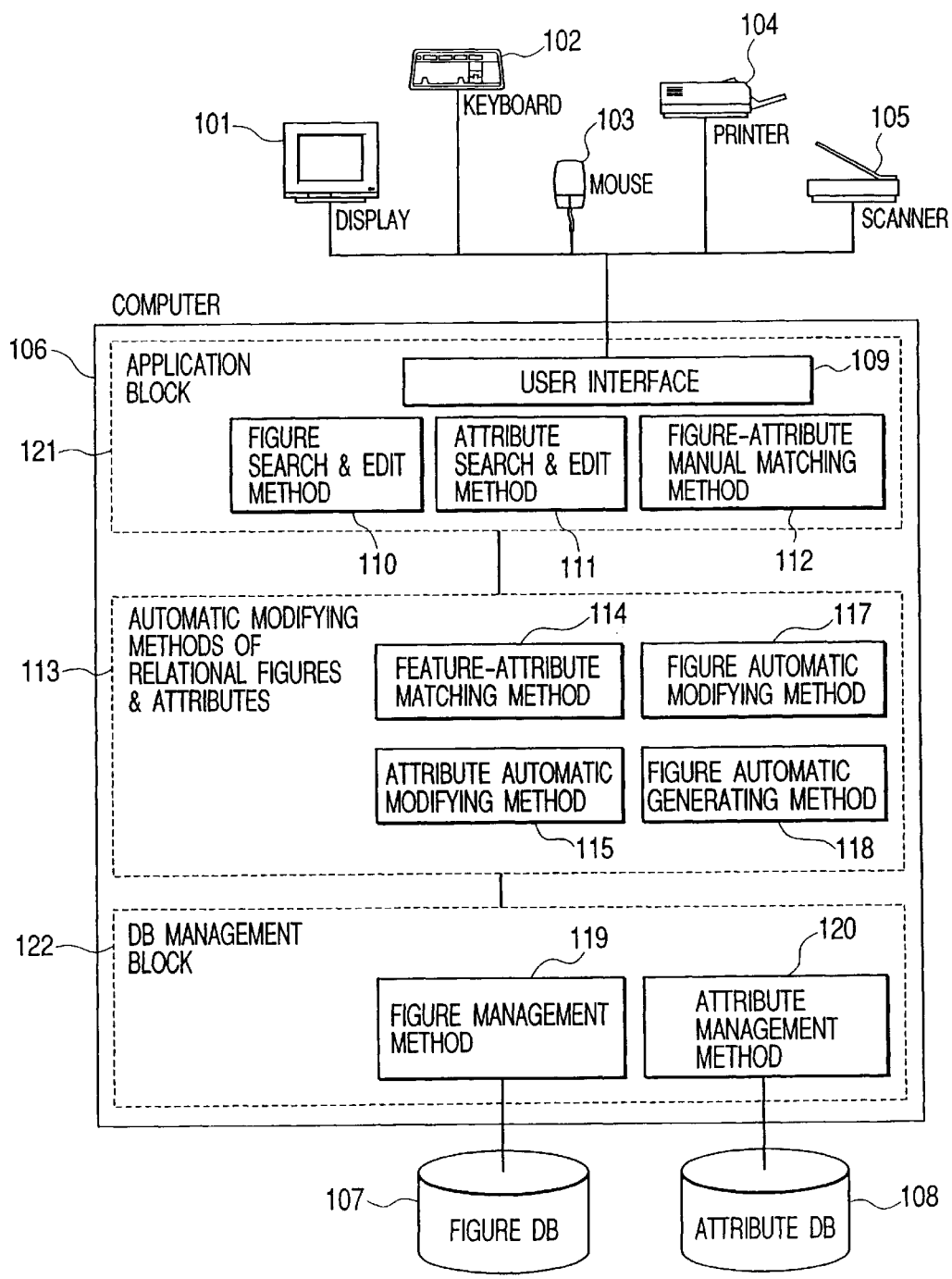
FIG. 1 is a block diagram showing a preferred embodiment of a figure management system according to the present invention.

Referring to FIG. 1, there is shown a block diagram indicating a preferred embodiment of a figure management system according to the present invention. The following describes a case where the figure management system of the present invention is employed as a geographic information system.

In the figure management system, a computer 106 is provided as signal processing means. A display monitor 101 used for displaying figures, a keyboard 102 used for performing figure search and edit operations, a mouse 103, a printer 104 used for printing out figures, a scanner 105 used for reading in figures drawn on paper to attain electronic forms thereof, and other input-output devices are connected with the computer 106 through a user interface 109. Further, a figure DB 107 for storing data of plural kinds of figures and an attribute DB 108 for storing object attribute data are connected with the computer 106.

The computer 106 comprises the following functional blocks to be carried out through program execution: a DB management block 122 including a figure management method function 119 for managing the figure DB 107 and an attribute management method function 120 for managing the attribute DB 108; an application block 121 including the user interface 109, a figure search-edit method function 110 for search and edit operations on figures, an attribute search-edit method function 111 for search and edit operations on object attributes, and a feature-attribute manual matching method function 112; and a relational attribute and figure automatic modifying block 113 disposed between the DB management block 122 and the application block 121.

The relational attribute and figure automatic modifying block 113 includes a feature-attribute automatic matching method function 114 for automatically associating input figures and object attributes, an attribute automatic modifying method function 115 for modifying object attributes by reading figure positions and connection relationships in correspondence with features on modified figures, a figure automatic modifying method function 117 for supporting user's operation of related-figure modification by generating temporary features on related figures or by marking changed or deleted features, and a figure automatic generating method function 118 for automatically generating figures under condition that object positions, connection relationships and attributes necessary for figure generation are available. The details of the processing operations of each of these functions will be described later.

Figure 2:
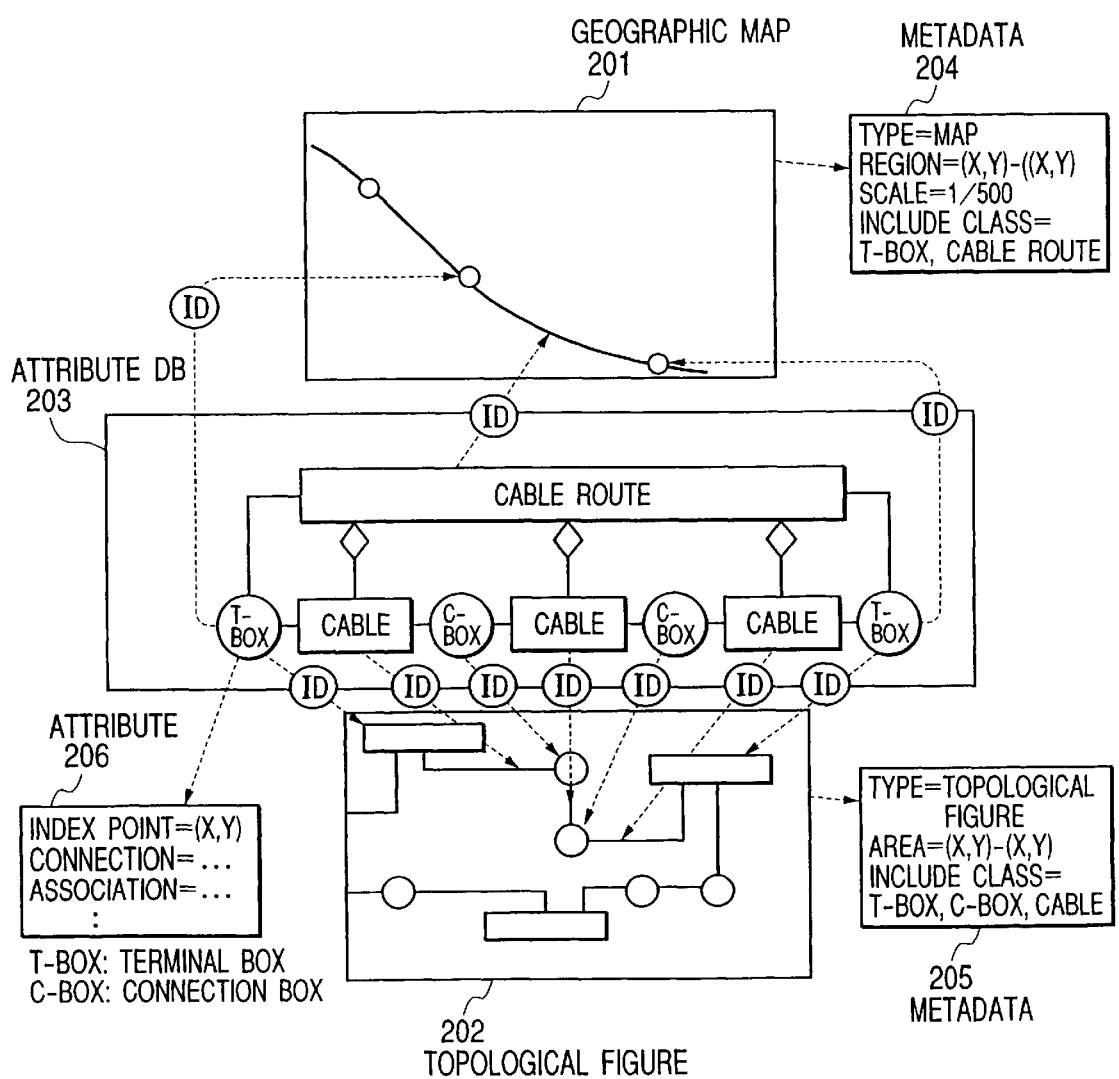
FIG. 2 is a diagrammatic illustration for explaining a plurality of related figures and object attributes managed in the figure management system presented in FIG. 1.

Referring to FIG. 2, there is shown a diagrammatic illustration for explaining a plurality of related figures and object attributes managed in the figure management system presented in FIG. 1.

Plural kinds of figures concerning the same part to be managed include a geographic map 201 and a topological figures 202. On the figures, specified kinds of objects and mutual position-connection relationships thereof are indicated with respect to a limited space region according to specified rules. For representation of a certain region, a plurality of figures including geographic maps, topological figures, maps based on different scales, maps based on different projection viewpoints, etc. may be used. The geographic map 201 is an example of a figure indicating connection relationships, positions and shapes of objects, and the topological figures 202 is an example of a figure indicating only connection relationships of objects. The figures 201 and 202 are provided with metadata 204 and 205, respectively. The metadata are figure attribute data indicating a space region represented on a figure, a category of each object represented thereon, a distinction between a geographic map and a topological figure, map reference point coordinates, a map scale, a projection method, etc. The figures and metadata thereof are stored in the figure DB 107.

Attribute data 206 is used to represent attributes of each object. In each attribute data 206, there are defined an absolute coordinate value of a representative point indicating a position of an object (degrees of latitude and longitude, or any other coordinate value that can uniquely determine an object location regardless of an object category), an inter-object relationship, i.e., a connection relationship indicating which object is connected with an object of interest, and an association relationship indicating what objects are included in the object of interest and in which object the object of interest is included. Each attribute data 206 containing these attribute items is stored in the attribute DB 108. On a plurality of related figures, the same ID code is assigned to features representing the same object, and an object attribute is related therewith.

Figure 3:
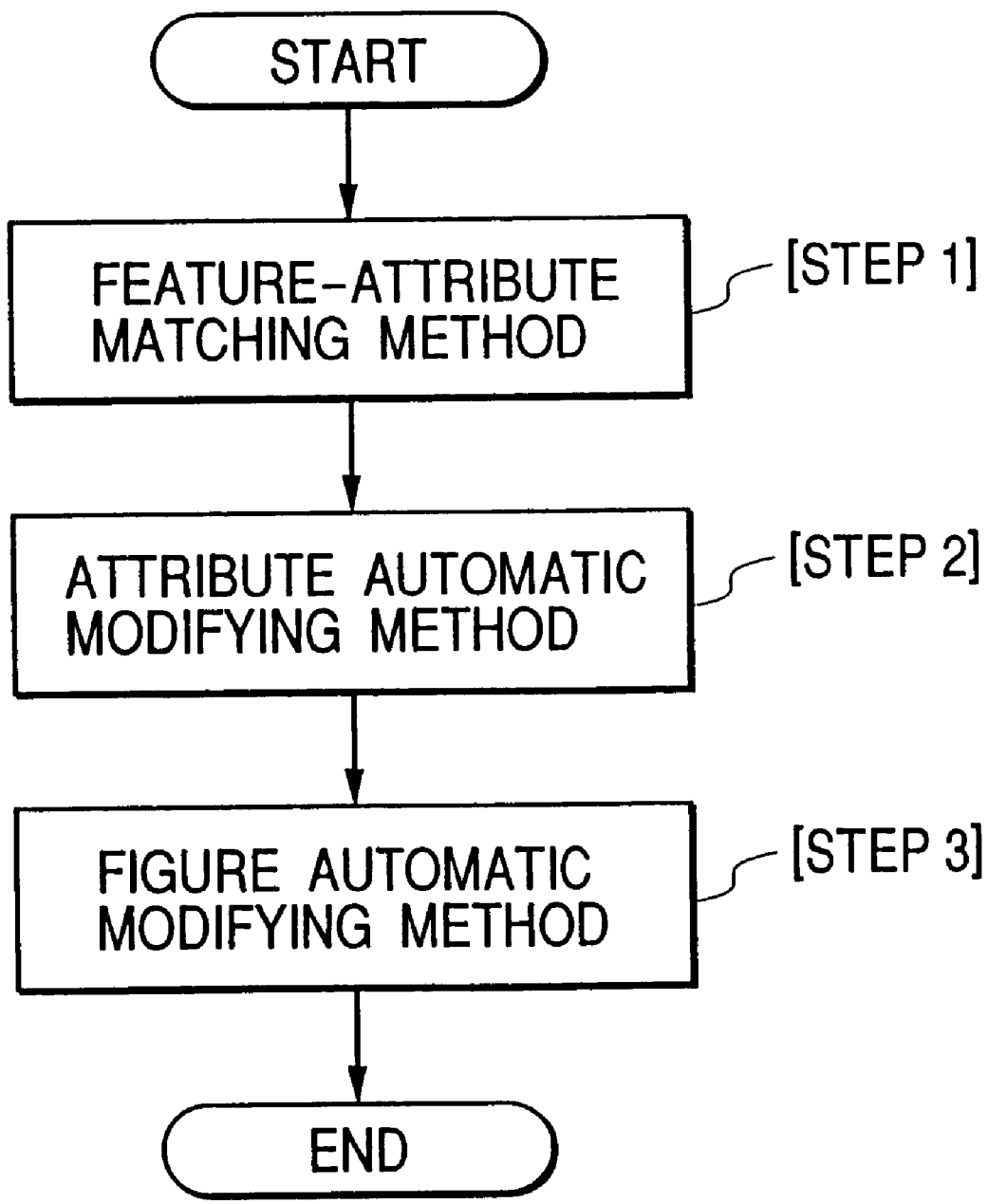
FIG. 3 is a flowchart showing processing steps in a preferred embodiment of a figure modifying method used in the figure management system according to the present invention.

Referring to FIG. 3, there is shown a flowchart of processing steps in a preferred embodiment of a figure modifying method used in the figure management system according to the present invention. The following describes processing operations in a situation where data of a new figure is to be stored into each database.

STEP 1:

Using the feature-attribute manual matching method function 112 and the feature-attribute automatic matching method function 114 indicated in FIG. 1, an ID code is determined for associating each feature on a new figure with object attribute data, data concerning the new figure is stored into the figure DB 107, and any feature for which ID code cannot be determined (e.g., a discrepant or renewed feature) is recognized and presented onto an output device. More specifically, through one of the input devices (101–105) and the user interface 109, the new figure is input into the application block 121 of the computer 106. After the new figure is thus input, each feature on the new figure is checked for matching with object attribute data contained in the attribute DB 108 using the feature-attribute manual matching method function 112 and the feature-attribute automatic matching method function 114. An ID code for referencing the corresponding object attribute data is assigned to each feature, and then data concerning the new figure is stored into each DB.

Examination of matching between each feature and object attribute data is carried out through man-machine interactive operations in which two methods, (1) user's manual matching 112 and (2) automatic matching 114, are repeated. In the automatic matching, object positions are compared in terms of absolute coordinates, and object connection relationships are examined for matching. For each matched feature, a corresponding object ID code is assigned.

If any feature is in an unmatched state, it signifies that a wrong figure has been input or the figure concerned has been renewed. The user of the system forms a judgment on this condition.

STEP 2:

Using the attribute automatic modifying method function 115 indicated in FIG. 1, objects corresponding to renewed features on the input figure and attributes in relation to the objects are modified.

For any feature that has been recognized as a renewed feature, object attribute data corresponding thereto is modified using the attribute automatic modifying method function 115. More specifically, a newly added object is registered, and an attribute of a deleted object and an attribute of an object whose connection relationship or position has been changed are modified. Further, an attribute of an object in relation thereto is modified according to the attribute modification thus made. That is to say, a connection attribute of an object to be connected with any renewed object is modified, an object having an association relationship therewith is registered, and any connection relationship concerned is modified.

STEP 3:

Using the figure automatic modifying method function 117 indicated in FIG. 1, a feature corresponding to each renewed object is added to a related figure or marked for giving support to modification to be made by the user. That is to say, each feature on related figures which have already been stored is modified using the figure automatic modifying method function 117. For figure automatic modification, the related figures are searched to find out each feature having an ID code corresponding to an object attribute modified by the attribute automatic modifying method function 115. For each newly registered object, a temporary feature having a proper connection relationship setting is registered in the related figures. Each temporary feature is displayed on the display monitor 101 which is one of the output devices of the figure management system, and the user corrects a position and shape of the temporary feature displayed on the display monitor 101. Through the above-mentioned procedure, object attributes and related figures can be modified in an interlinked fashion.

Further, in a situation where sufficient data elements for figure generation, such as object attributes, object positions and connection relationships of objects, are available, a new figure is generated using the figure automatic generating method function 118 as specified.

The above STEPS 1, 2 and 3 will be described in further detail later in connection with a preferred exemplary embodiment of the figure management system arranged for graphical information system application in a wide area network (WAN) using sewage piping facilities.

Figure 4:
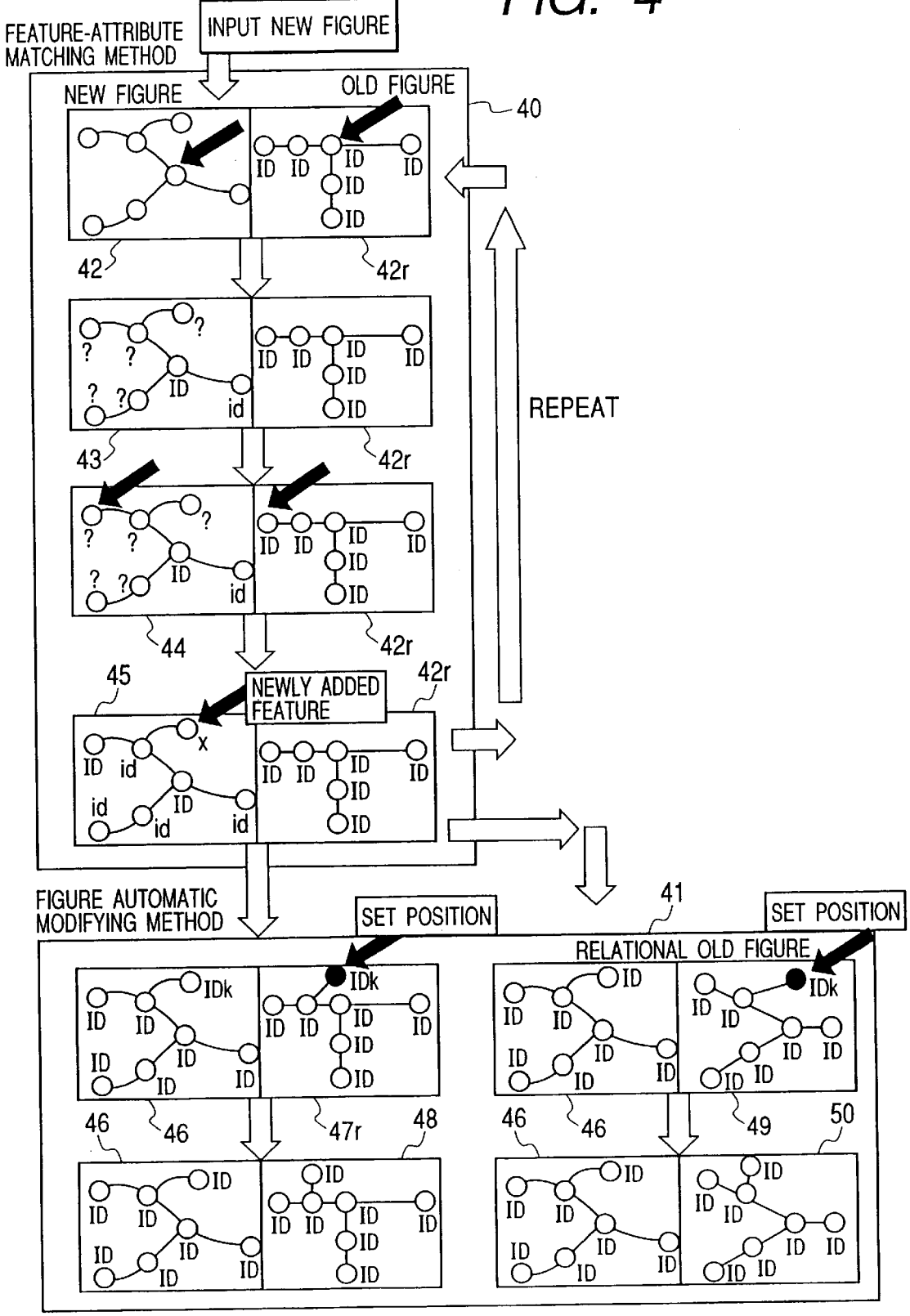
FIG. 4 is a diagram showing display screens at respective processing steps in use of a relational attribute and figure automatic modifying block on input of a new figure.

Referring to FIG. 4, there is shown a diagram of display screens on the display monitor 101 at respective processing steps in the relational attribute and figure automatic modifying block on input of a new figure. In FIG. 4, the hollow arrow indicates a progress direction of processing.

A block 40 indicates a group of processing operations in which an ID code corresponding to each object is assigned to each feature on the new figure.

A screen 42 is an initial screen of relational modification. On the display monitor 101 in FIG. 1, the user can view an existent figure 42r in a window on the right side and a new figure 42 (screen 42) in a window on the left side. Connection relationships of the same objects are represented on the existent figure 42r and the new FIG. 42.

Each feature has one of four attribute states; "ID defined", "ID presumed", "ID undefined" and "ID impossible". On figures, these states are indicated as "ID", "id", "?" and "x", respectively.

On the existent figure 42r, an ID code corresponding to object attribute data is set for each feature indicated by the solid circle. Although different ID codes are set for respective features, "ID" marks having no code number are indicated in FIG. 4 for the sake of simplicity in explanation. On the new figure 42 immediately after input thereof, no ID code is set for any feature. The user specifies that a feature at a point of trifurcation indicated by the solid arrow on the new figure 42 and a corresponding feature on the existent figure 42r represent the same object. That is to say, at the point of trifurcation on the new figure 42, the user specifies the same ID code as that assigned to a corresponding point of trifurcation on the existent figure 42r. At this step of operation, the feature-attribute manual matching method function 112 shown in FIG. 1 is used for set up an association therebetween.

A screen 43 (figure 43) indicates the next step of operation. On the screen 43, the ID code of the feature at the point of trifurcation on the new figure 42 is defined as specified by the user, i.e., the same ID code as that of the corresponding feature on the existent FIG. 42r is given to the feature at the point of trifurcation on the new FIG. 42. Further, on the screen 43, an id code of a feature at the right adjacent position of the feature defined by the user as mentioned above is presumed and set up with the feature-attribute automatic matching method function 114 shown in FIG. 1. Since the right adjacent feature is located at an end point next to the feature defined by the user, it is possible to uniquely identify the right adjacent feature according to network rules. Therefore, the right adjacent feature is identified through processing by a program incorporated in the computer 106. The ID states of other features on the new figure 42 are still undefined as indicated by "?". The details of association rules of the feature-attribute automatic matching method function will be described later.

Further, on a screen 44 (figure 44), the user manually sets up an association between two features indicated by the solid arrows on the new figure 42 and the existent figure 42r (using the feature-attribute manual matching method function 112 shown in FIG. 1).

On a screen 45 (figure 45), id codes of most of the remaining features are presumed with the feature-attribute automatic matching method function 114 according to the ID codes which have been defined through manual association mentioned above. At this step of operation, if there is a mismatch between the new and existent figures in terms of connection relationship, a mark "x" indicating a state that ID is impossible is given to an unidentifiable feature on the new figure 42. Then, the user judges whether the unidentifiable feature marked "x" is a newly added feature or a discrepant feature. If it is judged that the unidentifiable feature is discrepant, the current execution of relational modification is suspended for elimination of the cause of discrepancy.

If there remains any feature marked "?" (ID-undefined state) or "x" (ID-impossible state indicating discrepancy) on the new figure 42, the user returns to the screen 42 to repeat the above steps again. When there remains no feature marked "?", the user proceeds to the next relational processing 41. In the next relational modification processing 41, each renewed part found on the new figure is reflected in a group of other related existent figures.

On a figure 46 (screen 46), a new code IDk is assigned to a newly added feature (object), which is reflected in the existent figure 42r and another related figure 49. On each of the existent figure 42r and the related figure 49, the newly added feature is indicated by the solid circle. That is to say, in the computer 106 (signal processing means), a feature of the newly added object IDk is automatically inserted on the existent figure 42r and the related figure 49. Thus, temporarily, figures 47 and 49 are formed through automatic operation. At this step of operation, although a connection relationship concerning the newly added object IDk is identified already, a feature position thereof is not yet known. Therefore, the user determines a feature position of the newly added object IDk according to the figures 46. Thus, on the figures 47 and 49, a feature position of the newly added object IDk is defined, thereby producing figures 48 and 50.

Then, the following describes preferred embodiments of the figure management system and figure modifying method in an example of a geographic information system employed for managing a wide area network (WAN).

Referring to FIG. 5, there is shown a structure of the WAN managed by the geographic information system.

Between an institution 501 such as a supervisory office or a sewage treatment plant and another institution 502, a WAN cable 503 is connected in a network arrangement. The cable 503 is run through an underground sewer pipe 504 used as a sewer culvert. At the institutions 501 and 502, the cable 503 is connected with terminal boxes 506 and 507, respectively. From the terminal box 506, the cable 503 is extended to a machine 508 such as an ATM in the institute, and from the terminal box 507, the cable 503 is extended to a machine 509. Further, the cable 503 may be connected with a cable running to another institution. For cable-to-cable connection, a connection box 510 is used. The connection box 510 is installed in a manhole 511.

The cable 503 contains a plurality of optical fiber ribbons 505 or core wires. Actual information communication is performed through each fiber ribbon 505. In the connection box 510, the fiber ribbon 505 is connected with a bridge 512, which is a point of 1:1 connection of two segments of cabling. Further, in the terminal box 507, each fiber ribbon is connected with a port 513. Each port, having an assigned number, serves as a connection port through which fiber ribbons are extended for a particular purpose of application.

In most situations, there are ten-odd connection boxes between the terminal boxes. For the purpose of machine control, management of each connection box is of importance. In contrast, for the purpose of geographic information system application, it is sufficient to attain a correspondence relationship between the terminal boxes at both ends, i.e., it is not required to attain data of any connection box located therebetween. Therefore, it is assumed here that a group of cabling segments between the terminal boxes is a single cable, which is referred to as a cable route. Each cable route has attribute data such as a total extension length of a group of cabling segments. Similarly, it is assumed that a group of fiber ribbon segments connected in series between the terminal boxes is a single fiber ribbon, which is referred to as a fiber ribbon route. Each fiber ribbon route has attribute data such as application, use condition, power loss through fiber ribbon, etc.

Figure 6A:
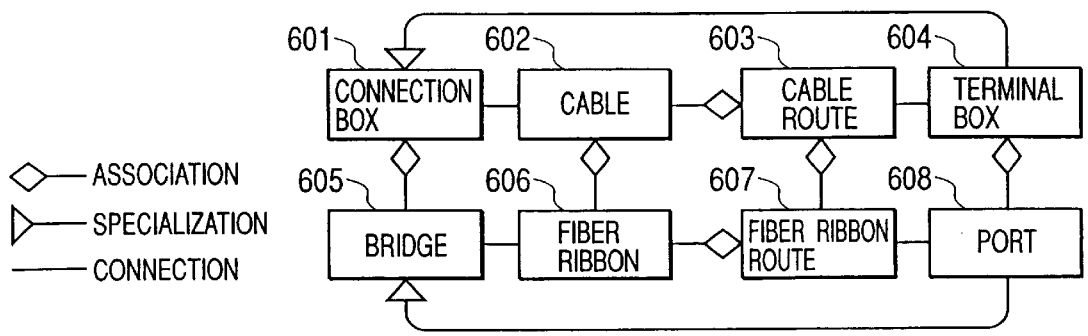
FIG. 6 is a diagram showing inter-connection relationships and attributes of objects managed by a figure management system in a WAN using sewage piping facilities in a preferred embodiment of the present invention.

Referring to FIG. 6, there is shown a diagram indicating inter-connection relationships and attributes of objects managed by the figure management system in the wide area network using the sewage piping facilities mentioned above. In FIG. 6(a), respective kinds of objects are represented by features 601 to 608 with inter-object relationships described in the Unified Modeling Language (UML) which has been developed as an language for object modeling unification. Each kind of object may be regarded as a class in object-oriented processing.

Between a pair of objects, there is a connection relationship, association relationship or specialization relationship. The connection relationship means that an object is connected with another object. The association relationship means that an object includes a set of different objects, and the specialization relationship means that an object can be regarded as a special variant of another object.

Figure 6B:
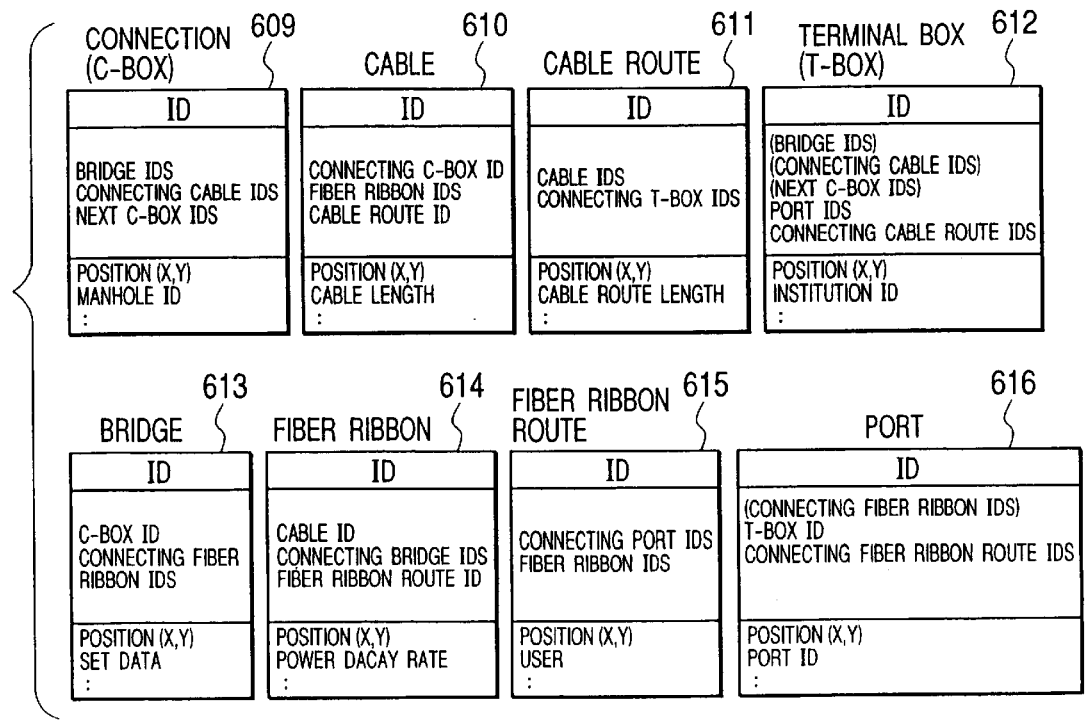

In FIG. 6(b), there are shown tables 609 to 616 which contain attribute data of the above eight kinds of objects (eight features). In each table, the upper field indicates an ID code of the object concerned, the middle field indicates ID codes of other objects having connection-association (class) relationships with the object concerned, and the lower field indicates attributes of the object concerned. The following briefly describes each object used in the present preferred embodiment.

The connection box 601 is a device for connecting cables. The table 609 contains class relationship data such as an ID code of each included bridge, an ID code of a connected cable, and an ID code of an adjacent connection box. Further, the table 609 contains attribute data of the connection box 601 such as position coordinates thereof, a number assigned to a manhole for installation, etc.

A plurality of bridges 605 are provided in a connection box, and each bridge 606 is used as a point for connecting fiber ribbons. The table 613 contains class relationship data such as an ID code of an connection box to which the bridge 606 belongs, and an ID code of a fiber ribbon connected at each end thereof. Further, the table 613 contains attribute data of the bridge 606 such as position coordinates thereof, a date of installation (year, month, day), etc.

The cable 602 comprises a plurality of fiber ribbons covered with protective coating. It is assumed that a connection from a terminal box to a connection box then to the next connection box is made by a single cable. The table 610 contains class relationship data such as an ID code of an connection box at each end, an ID code of each included fiber ribbon, and an ID code of a cable route to which the cable 602 belongs. Further, the table 610 contains attribute data of the cable 602 such as position coordinates thereof, a cable extension length, etc.

The fiber ribbon 606 is an optical fiber or a core wire included in a cable. The table 614 contains class relationship data such as an ID code of a cable to which the fiber ribbon 606 belongs, an ID code of a bridge at each end, and an ID code of a fiber ribbon route to which the fiber ribbon 606 belongs. Further, the table 614 contains attribute data of the fiber ribbon 606 such as position coordinates thereof, a measured power decay rate, etc.

The cable route 603 is a group of cables connected between terminal boxes. The table 611 contains class relationship data such as an ID code of each included cable, and an ID code of a terminal box at each end. Further, the table 611 contains attribute data of the cable route 603 such as position coordinates thereof, a total length of cable extension, etc.

The fiber ribbon route 607 is a group of fiber ribbons connected between terminal boxes. The table 615 contains class relationship data such as an ID code of a port at each end, and an ID code of each included fiber ribbon. Further, the table 615 contains attribute data of the cable route 607 such as position coordinates thereof, usage, a total power decay rate, etc.

The terminal box 604 is a connection device through which the user can access the WAN. The terminal box 604 has a specialization relationship with a connection box, i.e., the terminal box 604 may be regarded as a special variant of a connection box. The table 612 contains class relationship data inherited from the connection box concerned, such as an ID code of a connected cable and an ID code of an adjacent connection box, and class relationship data specific to the terminal box 604, such as an ID code of each included port and an ID code of a connected cable route. Further, the table 612 contains attribute data of the terminal box 604 such as position coordinates, a name of an institution where the terminal box 604 is installed, etc.

The port 608 serves as a connection port for allowing the user to make connection to the WAN. The port 608 has a specialization relationship with a bridge, i.e., the port 608 may be regarded as a special variant of a bridge. The table 616 contains class relationship data inherited from the bridge concerned, such as an ID code of a connected fiber ribbon, and class relationship data specific to the port 608, such as ID code of a terminal box to which the port 608 belongs and an ID code of a connected fiber ribbon route. Further, the table 616 contains attribute data of the port 608 such as position coordinates thereof, a port number, etc.

Referring to FIG. 7, there are shown four kinds of figures concerning the same part to be managed for figure management of the wide area network using the sewage piping facilities mentioned above. In FIG. 7, objects and conditions thereof are indicated. Relationships of the objects (shown in FIG. 6) are partially described in each of these figures.

Each of figures 702, 704, 706 and 708 provides figure attribute data including a spatial region represented thereon, kinds of objects indicated thereon, and a category showing whether a map or a topological figure is formed. Where a map is formed, metadata 703, 705, 707 and 709 are provided to indicate figure data such as reference point coordinates, a scale and a projection method.

The figure 702 is a 1/500-scale map, on which terminal boxes, connection boxes and cables for connecting them are described accurately according to actual installation positions. Further, roads and underground pipe lines are indicated as reference features.

The figure 706 is a machine connection figure, on which terminal boxes, connection boxes and cables for connecting them are described in a topological fashion similarly to the figure 702 (1/500-scale map). Unlike the 1/500-sale map, it is not required to indicate accurate positions of objects. In the figure 706, the objects are so rearranged that the user can read them with ease.

The figure 704 is a network topology figure, on which the connection boxes indicated in the machine connection figure 706 are omitted. The figure 704 is used for checking network connection conditions in a wide region. Cable routes, each representing a group of cables connected in series, and terminal boxes are indicated as objects in the figure 704.

The figure 708 is a fiber ribbon connection figure, which provides details to the deepest degree among the figures managed in the present preferred embodiment. Detailed connection conditions of each fiber ribbon are described in the figure 708. In addition to terminal boxes, connection boxes and cables, a port in each terminal box, a bridge in each connection box, and a fiber ribbon in each cable are indicated in the figure 708. The figure 708 (fiber ribbon connection figure) is automatically generated according to connection relationships of terminal boxes, cables and connection boxes acquired from the machine connection figure 706 and the 1/500-scale map FIG. 702, relationships of bridges in each connection box and fiber ribbons acquired from the attribute DB, and relationships of ports in each terminal box and fiber ribbons.

Then, using the above-mentioned wide area network (WAN) as an example, the following describes further details of each step in the figure modifying method shown in FIG. 3.

Figure 9:
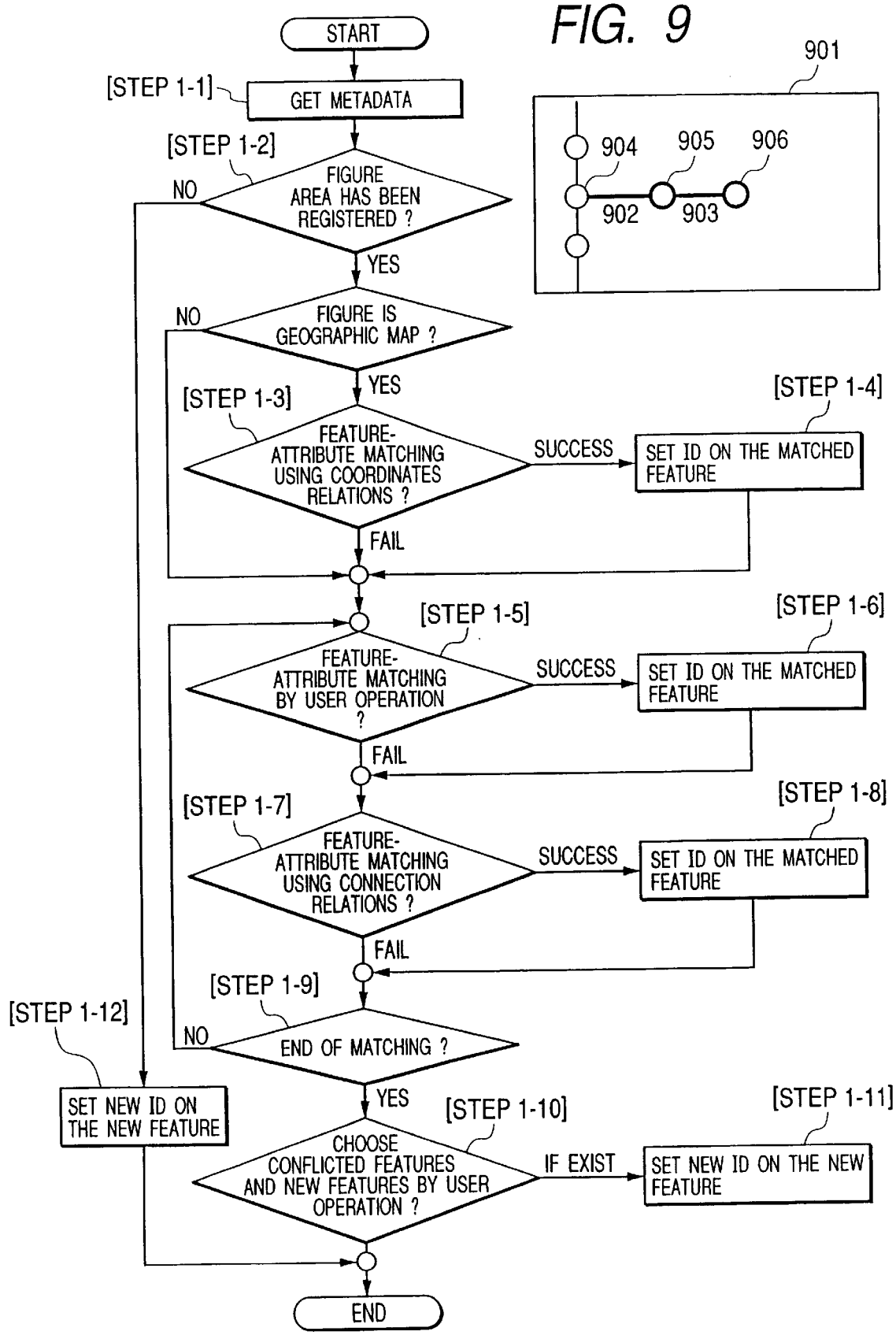
FIG. 9 is a detailed flowchart of STEP 1 indicated in FIG. 3.

Referring to FIG. 9, there is shown a detailed flowchart of STEP 1 indicated in FIG. 3. In execution of processing at STEP 1, each feature on a new figure is checked for matching with object attribute data which has already been stored, an ID code for referencing the corresponding object attribute data is assigned to each matched feature, and a new ID code is assigned to a newly added feature. Then, a list of feature ID codes thus modified is passed as parameter data to STEP 2 for modification of object attribute data. In the present preferred embodiment of the figure management system, an ID scheme common to all the figures and object attributes is employed, and the same ID code is assigned to a feature which represents the same object for setting up an association with particular object attribute data. A variety of ID schemes may be employed in practice of the present invention.

Figure 8:
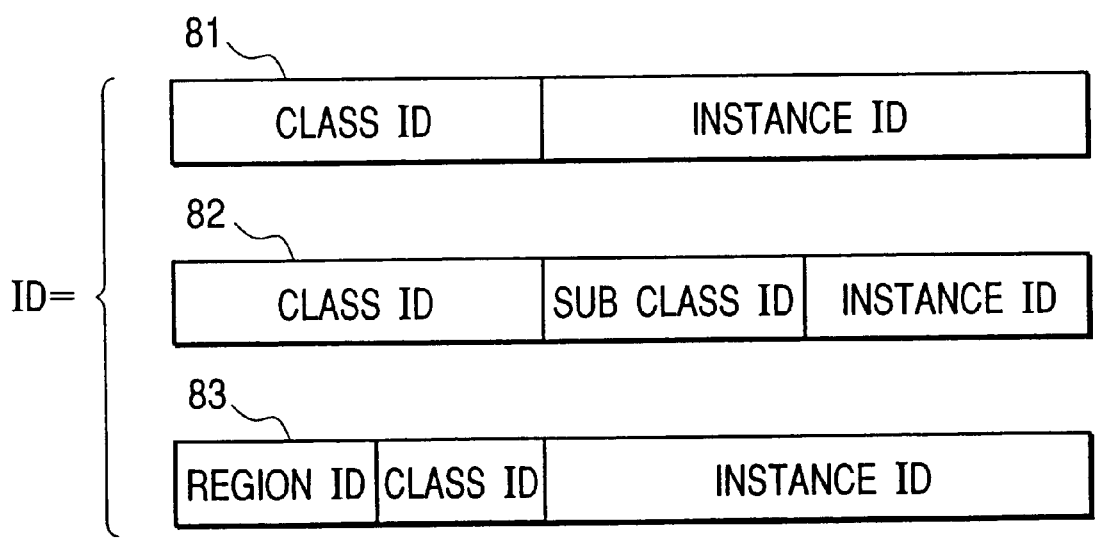
FIG. 8 is a diagram showing examples of ID code formats used in the figure management system according to the present invention.

Referring to FIG. 8, there are shown examples of ID code formats used in the figure management system according to the present invention. In a format 81, which is the simplest ID code format, an ID code is represented by a combination of a class ID indicating the kind of an object and an instance ID indicating a serial number assigned to each object of the same kind. Thus, since the kind of each object can be identified just by an ID code thereof, a search can be carried out efficiently. Even in a case where different persons are in charge of figure management and modification for different kinds of objects, it is not required to give particular consideration to a possible conflict between ID codes in simultaneous modification of figures and attributes. An instance ID may be assigned arbitrarily for each class ID. Therefore, as shown in a format 82, a subclass ID may be added to specify further details concerning the kind of an object. Moreover, as in format 83, a region ID may be added to indicate each management region. Thus, in a case there modification of figures and attributes is conducted in each region, it is not required to take account of a possible conflict between ID codes. In addition, it is also possible to provide a semantic definition of a new class for each region.

Referring back to FIG. 9, the following describes each step of the detailed flowchart.

STEP 1-1:

Metadata of an input figure is referenced to check a spatial region represented thereon, kinds of objects indicated thereon, and a category showing whether a map or a topological figure is formed. Where a map is formed, reference point coordinates, a scale and a projection method are also checked.

STEP 1-2:

It is checked whether a spatial region represented on the input figure has already been registered in the attribute DB or not. For this purpose, a list of spatial regions represented on already input figures is prestored in the attribute DB, and then at the time of check, the spatial region represented on the input figure is compared with the list prestored in the attribute DB. If the spatial region represented on the input figure is not found in the attribute DB, it signifies that the attribute DB does not contain any objects indicated on the input figure. In this case, STEP 1-12 is taken to assign an ID code to each feature on the input figure according to the kind thereof.

STEP 1-3:

A judgment is made to check whether the input figure is a map or not. If it is judged that the input figure is a map, the following operation is performed.

In case that the input figure is a map, positions of features on the figure are significant. A representative point coordinate value of a feature is determined from a feature position on the input figure, and the coordinate value thus determined is converted to an absolute coordinate value using the reference point coordinates, scale and projection method taken for the input figure which have been checked at STEP 1-1. Then, the absolute coordinate value thus attained is compared with object positions pre-registered in the attribute DB. As shown in the tables 609 to 616 in FIG. 6, each object is provided with a representative point coordinate value (x, y) as an attribute thereof. If a match is found between the representative point coordinate value attained from the input figure and a representative point coordinate value of any object in the attribute DB or if these representative point coordinate values are extremely close to each other, the feature of interest on the input figure is regarded as a feature indicating the corresponding object in the attribute DB. In this case, STEP 1-4 is selected.

Referring to FIG. 10, there is shown a diagrammatic illustration for explaining figure storage arrangements and feature-attribute matching in the present preferred embodiment. The following describes actual data structures of figures and features, how an ID code is assigned to each feature, and how a representative point is determined for each feature. On a figure 1001, a plurality of features are drawn, and each feature is indicated with a polygonal line having a pair of coordinates (x, y).

In a table 1008, there is shown a storage structure of figure data. Each figure data comprises a figure header and a plurality of feature records for respective features. The figure header indicates figure attribute data such as the number of features drawn in the figure of interest. Each feature record contains feature attribute data such as a layer number indicating the kind of the feature of interest and a set of composition points (x, y) of the feature, as well as an ID code of the feature. According to the ID code, the feature is associated with attribute data of an object represented by the feature. Where features on different figures have the same ID code, these features represent the same object.

Features are classified into two types; a node type feature 1002 represented by a point, such as a terminal box or connection box exemplified above, and an arc type feature 1003 represented by a line (polygonal line), such as a cable.

In a layer number which is one of attributes of a feature, the user pre-specifies which kind of object is represented by the feature, i.e., the user pre-specifies whether the feature is of a node type or an arc type. A feature 1004 is a node type feature, which has a closed loop indicated by polygonal lines. A feature 1005 is indicated as a symbol.

As a special type of node feature, it is allowed to define a symbol having just one pair of composition point coordinates (x, y). A table 1009 is provided as a symbol table for indicating an actual storage structure of symbol data.

The symbol table is arranged in the same form as that of a feature table containing a pair of composition point coordinates. On a screen of the display monitor in the figure management system, each symbol is displayed as a circle, rectangle or map mark which is defined in a separate table according to the layer number of the symbol.

A feature 1006 is an arc type feature, which has an open loop indicated by polygonal lines. A feature 1007 is another example of an arc type feature, in which a plurality of ID codes are assigned to represent a plurality of objects. In the feature 1007 having polygonal lines A-B-C-D-E-F-G, ID 1 is assigned to a polygonal segment ABC, ID 2 is assigned to a polygonal segment CDE, and ID 3 is assigned to a polygonal segment EFG. The feature 1007 is stored in a storage structure of a table 1010. In each feature record of the table 1010, ID codes are stored mixedly with composition point coordinates (x, y). Each ID code is owned by a polygonal segment extending from a composition point suffixed with the ID code to a point just before a composition point suffixed with the next ID code. In the feature record, a distinction between an ID code and a composition point is made by flagging a true or false value.

As a representative point of a node type feature, a centroid of composition points of the feature may be taken. In the feature 1004, a centroid of composition points can be used as a representative point thereof. In the feature 1005, a single composition point can be used as a representative point thereof. In an arc type feature, a centroid of composition points, a set of coordinates at both ends, or a combination of these may be used as a representative point thereof.

Referring back to FIG. 9, the following describes subsequent steps.

STEP 1-4:

An ID code of an object corresponding each feature of interest is registered.

STEP 1-5:

For any features that have not been associated with objects at STEP 1-3, feature-attribute matching is carried out at STEPS 1-5 to 1-8. At STEP 1-5, feature-attribute matching is performed manually by the user. If manual operation of feature-attribute matching is made for all the features that have not been associated with objects at STEP 1-3, a heavy workload is imposed on the user. To avoid this, feature-attribute manual matching and feature-attribute automatic matching based on feature connection relationships (STEP 1-7) are carried out in combination.

Figure 11:
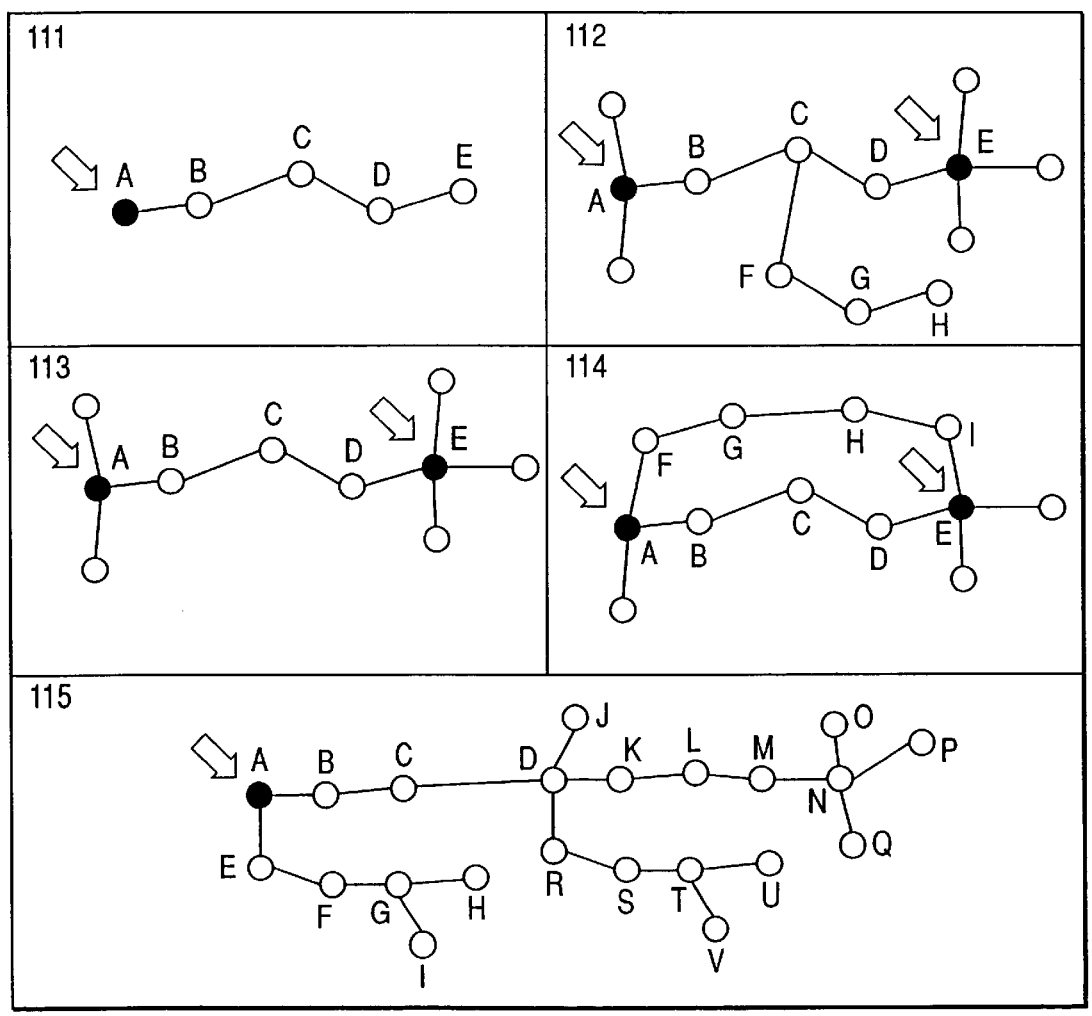
FIG. 11 is a diagrammatic illustration for explaining feature-attribute matching based on FIG. connection relationships in a preferred embodiment of the figure modifying method used in the figure management system according to the present invention.

Referring to FIG. 11, there is shown an example of feature-attribute manual matching operation conducted by the user at STEP 1-5. In feature-attribute manual matching, the user sets up associations only for distinctive node features, i.e., a network end point such as node A on a FIG. 1101, and network branch points such as nodes A and E on a figure 1102.

Figure 13:
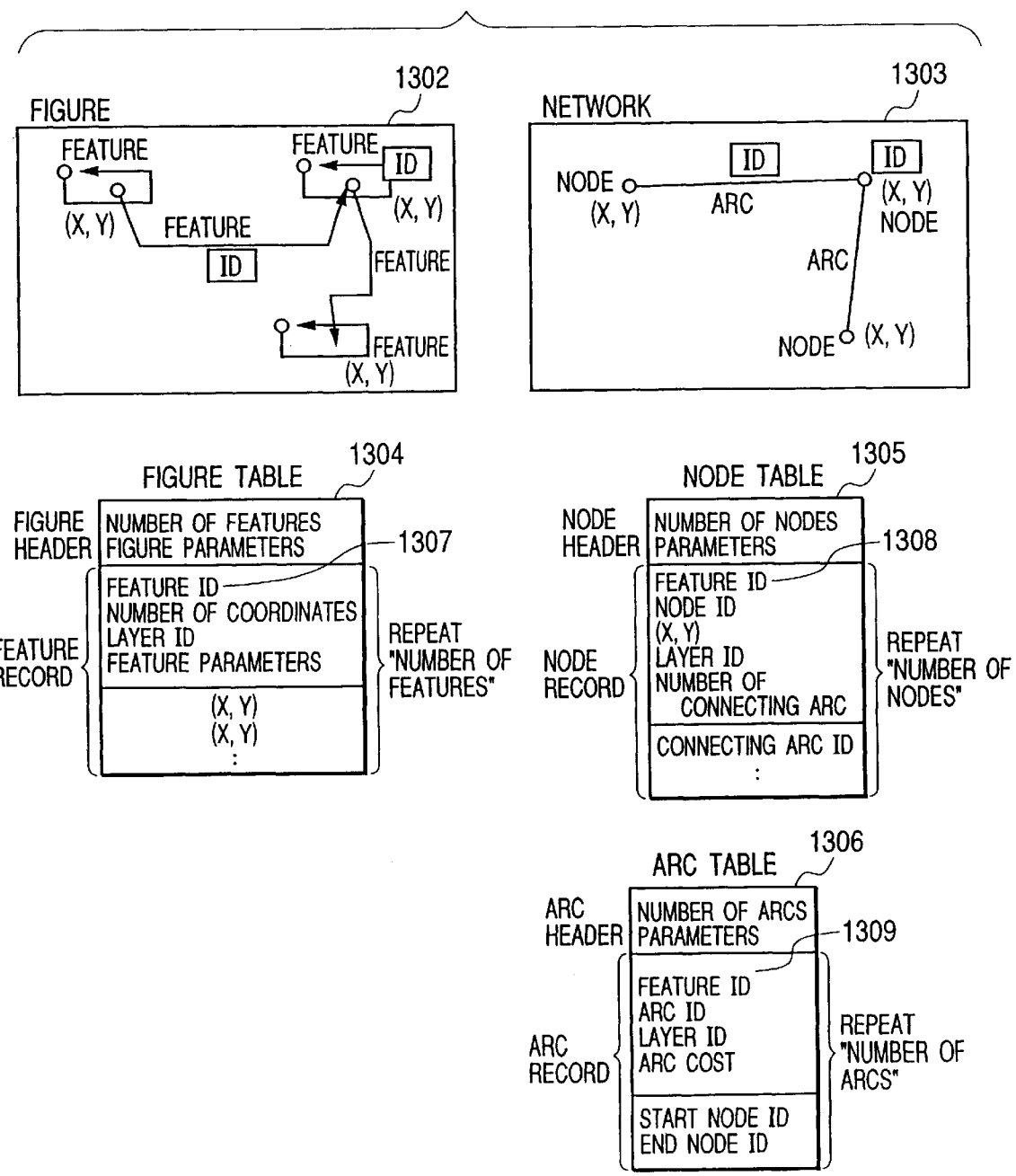
FIG. 13 is an explanatory diagram showing a node table and an arc table for managing connection relationships of features on figures in a preferred embodiment of the figure modifying method used in the figure management system according to the present invention.

STEP 1-6:

An ID code of an object corresponding to each feature processed at STEP 1-5 is registered. STEP 1-7:

At this step, feature-attribute automatic matching based on feature connection relationships is carried out. With reference to FIG. 12, how feature connection relationships are extracted from features will be explained below. With reference to FIG. 13, node and arc tables used for managing feature connection relationships will be explained. Then, with reference to FIG. 11, feature-attribute matching through comparison of feature connection relationships and object attribute connection relationships will be explained.

As shown in FIG. 12, feature connection relationships are classified into an arc-to-arc connection, a node-to-arc connection, and an arc-to-arc connection with node interposed.

A relationship of arc-to-arc connection is determined as follows: As shown in a feature 1201, if an end point of a feature has the same position coordinate value as that of an end point of another feature, it is judged that these features are connected mutually. As shown in a feature 1202, if two features intersect each other at other than end points thereof, it is judged that these features are not connected mutually.

A relationship of node-to-arc connection is determined as follows: As shown in a feature 1203, if an end point of an arc feature is located inside a closed loop of polygonal lines of a node feature, it is judged that these feature are connected mutually. As shown in a feature 1204, if an end point of an arc feature is located on a closed loop of polygonal lines of a node feature, it is also judged that these features are connected mutually. As shown in a feature 1205 (as in the node feature 1005 indicated in FIG. 10), if an end point of an arc feature has the same position coordinate value as that of a symbol, it is judged that they are connected mutually.

A relationship of arc-to-arc connection with node interposed is determined as follows: In each case of figures 1206, 1207, 1208 and 1209, according to the above-mentioned rules, it is judged that two arc features are connected mutually with a node feature interposed. Further, as shown in a figure 1210 (as in the figure 1007 indicated in figure 10) which has a plurality of ID codes representing a plurality of objects, if each of composition points C and E corresponding to different ID codes is enclosed by node-figure polygonal lines, a connection relationship between each object and node feature can be extracted. The feature connection relationships explained above with reference to FIG. 12 are used repetitively. Therefore, feature connection relationships may be stored temporarily in a table for realizing higher speed of operation.

In FIG. 13, there are shown examples of node and arc tables used for managing feature connection relationships. In the node table, figures such as intersection points, terminal boxes and connection boxes are defined as node type features. In the arc table, features such as roads and cables are defined as arc type features. For all the nodes and arcs, associations of arcs connected with nodes and relations of nodes connected with arc ends are summarized in these tables.

A node table 1305 and an arc table 1306 are provided as network structure storage spaces. The node table 1305 comprises a node header and a plurality of node records for respective nodes. The node header indicates common attribute data of a group of nodes such as the number of nodes. Each node record contains node attribute data such as a node number, a node position (x, y), a set of arc numbers in node connection, and an ID code (1307) of a feature represented for the node of interest.

The node position (x, y) indicates a representative point coordinate value of a node feature as shown in the features 1004 and 1005 in FIG. 10.

The arc table 1306 comprises an arc header and a plurality of arc records for respective arcs. The arc header indicates common attribute data of a group of arcs such as the number of arcs. Each arc record contains arc attribute data such as an arc number, an arc cost value (e.g., arc length), node numbers at both ends of the arc of interest, and an ID code (1308) of a feature represented for the arc of interest. The node and arc tables may be applicable to a network search operation, e.g., shortest route searching or coverage searching. In execution of a network search operation, object-to-object connection relationships are checked at a very high frequency. Therefore, by using the node and arc tables, connection relationships can be referenced at a higher speed than by extracting connection relationships from each feature according to the rules shown in FIG. 12.

In FIG. 11, there is shown a diagrammatic illustration for explaining feature-attribute matching through comparison of feature connection relationships and object attribute connection relationships.

On a figure 1101, if a node feature A has been associated with object attribute data at STEP 1-5, feature-attribute automatic matching can be carried out for node features B, C, D and E according to rule 1 stated below.

[Rule 1: In case that there is just one unassociated node to be connected with an associated node, the unassociated node can be uniquely determined to allow feature-attribute matching.]

Since only the node feature B is to be connected with the associated node feature A on the figure 1101, the node feature B can be associated using the rule 1. Similarly, the node features C, D and E can be associated with object attribute data in a recursive fashion.

On a figure 1103, if node features A and E have been associated with object attribute data at STEP 1-5, feature-attribute automatic matching can be carried out for node features B, C and D according to rule 2 stated below.

[Rule 2: In case that there is just one shortest route for connection between two associated node points, the route and a series of nodes thereon can be uniquely determined for feature-attribute matching.] For network shortest route determination, the conventional Dijkstra's algorithm is applicable.

In connection between the associated node features A and E on the figure 1103, there is only one shortest route A-B-C-D-E. Therefore, the node features B, C and D can be associated with object attribute data.

On a figure 1102, all the node features can be associated with object attribute data using the rules 1 and 2. If node features A and E have been associated with object attribute data at STEP 1-5, feature-attribute automatic matching can be carried out for node features B, C and D since they are node features located on the shortest route A-B-C-D-E according to the rule 2. Then, since the node feature C can thus be associated, the node features F, G and H can be associated using the rule 1.

On a figure 1104, all the node features can be associated with object attribute data using the rule 2. If node features A and E have been associated with object attribute data at STEP 1-5, feature-attribute automatic matching can be carried out for node features B, C and D since they are node features located on the shortest route A-B-C-D-E according to the rule 2. Then, excluding the node features B, C and D thus associate in the network, a shortest route search is performed. As a result, the shortest route A-F-G-H-I-E is determined. Thereafter, the node features F, G, H and I on the route can be associated using the rule 2.

On a figure 1105, if a node feature A has been associated with object attribute data at STEP 1-5, feature-attribute automatic matching can be carried out for the remaining node features according to rule 3 stated below.

[Rule 3: In case that there are a plurality of unassociated routes to be connected with an associated node, each route is uniquely determined by extracting characteristics thereof for associating nodes thereon. The characteristics of each route are; (1) the number of nodes in connection to the next branch point node or end point node, and (2) the number of routes to be connected with the next branch point node.] If the node feature A on the figure 1105 has been associated with object attribute data at STEP 1-5, the node feature A is to be connected with two routes A-B-C-D and A-E-F-G. According to the rule 3, the routes A-B-C-D and A-E-F-G can be uniquely determined since the number of routes to be connected with the next branch point node D on the route A-B-C-D is 4 and the number of routes to be connected with the next branch point node G on the route A-E-F-G is 3. Thus, the node features A, B, C, D, E, F and G can be associated with object attribute data.

Further, three routes D-J, D-K-L-M-N, and D-R-S-T are to be connected with the node feature D. According to the rule 3, the routes D-J. D-K-L-M-N, and D-R-S-T can be uniquely determined since the number of nodes on the route D-J in connection to the next end point node J is 1, the number of nodes on the route D-K-L-M-N in connection to the next branch point node is 4, and the number of nodes on the route D-R-S-T in connection to the next branch point node T is 3. Thus, the node features J, K, L, M, N, R, S and T can be associated with object attribute data.

For the remaining unassociated node features H, I, U, V, O, P and Q, STEP 1-5 is taken again to perform feature-attribute manual matching by the user.

Then, the following describes how arc features are associated with object attribute data. Feature-attribute automatic matching can be carried out for arc features according to rule 4 stated below.

[Rule 4: An arc interconnecting two associated adjacent nodes can be uniquely determined to allow feature-attribute matching.]

On the figure 1101, if the node features A and B have been associated, an arc feature AB can be uniquely determined for feature-attribute matching.

As mentioned above, feature-attribute automatic matching based on feature connection relationships is carried out.

Referring back to FIG. 9, the following describes subsequent steps.

STEP 1-8:

An ID code of an object corresponding to each feature of interest is registered.

STEP 1-9:

If any feature cannot be associated with object attribute data, it signifies that the feature is improper (discrepant) or new (renewed). In this case, the feature is marked on the display monitor so that the user can judge whether it is a discrepant feature or a renewed feature.

STEP 1-10:

If the feature is a renewed feature, an ID code of an object corresponding to the feature is registered. Further, for modifying attribute data of an object represented by the feature, an ID list concerning the renewed features is passed as parameter data to the processing of STEP 2.

STEP 1-11:

An ID code described with reference to FIG. 8 is registered for each feature. A class ID is attained from a feature layer number and metadata, and as an instance ID, an unregistered number is assigned in ascending order of serial numbers. A figure 901 shown at the upper right of FIG. 9 is an example in which newly added features (arcs 902 and 903, nodes 905 and 906) are contained through the steps mentioned above.

Figure 14:
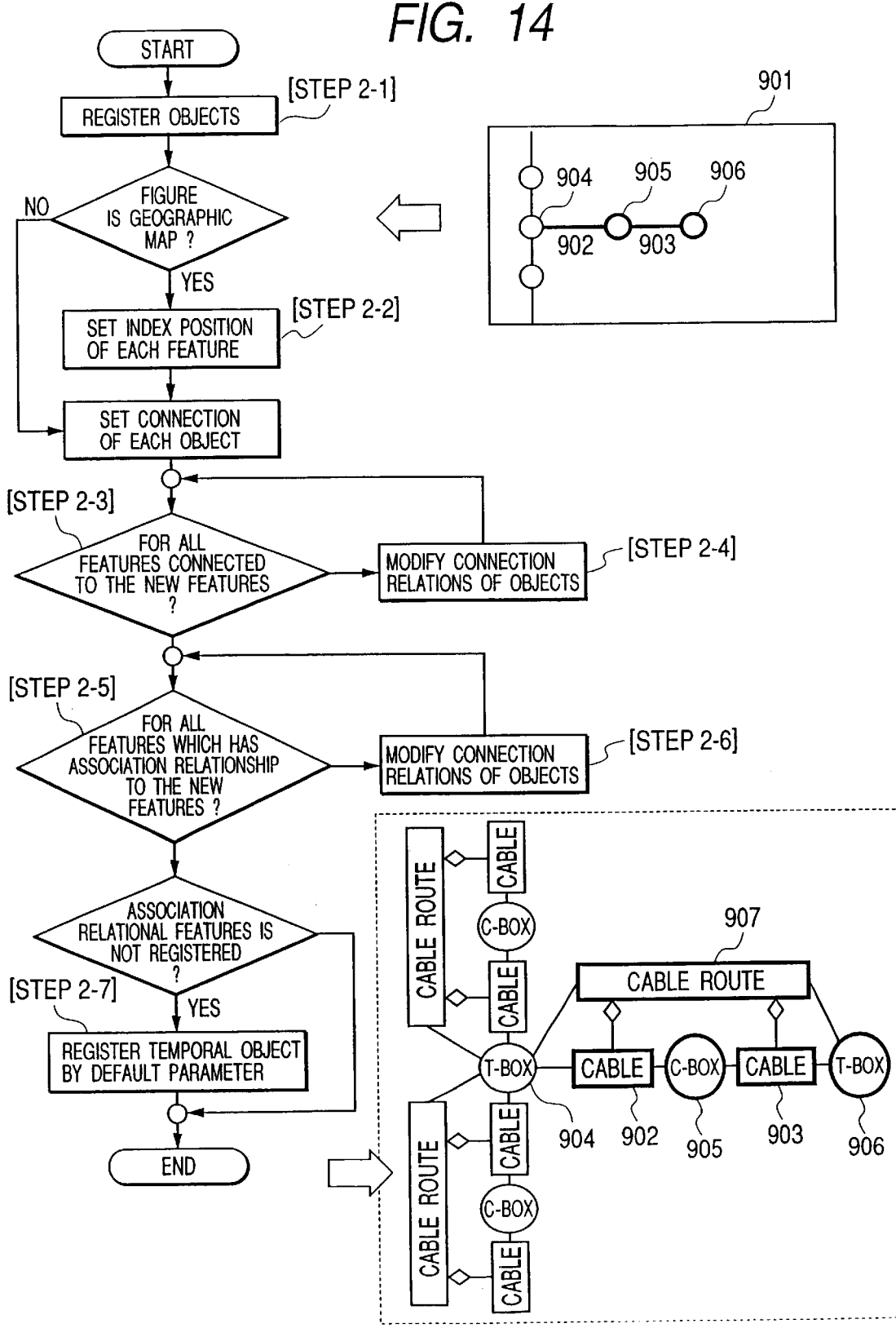
FIG. 14 is a detailed flowchart of STEP 2 indicated in FIG. 3.
Figure 15A:
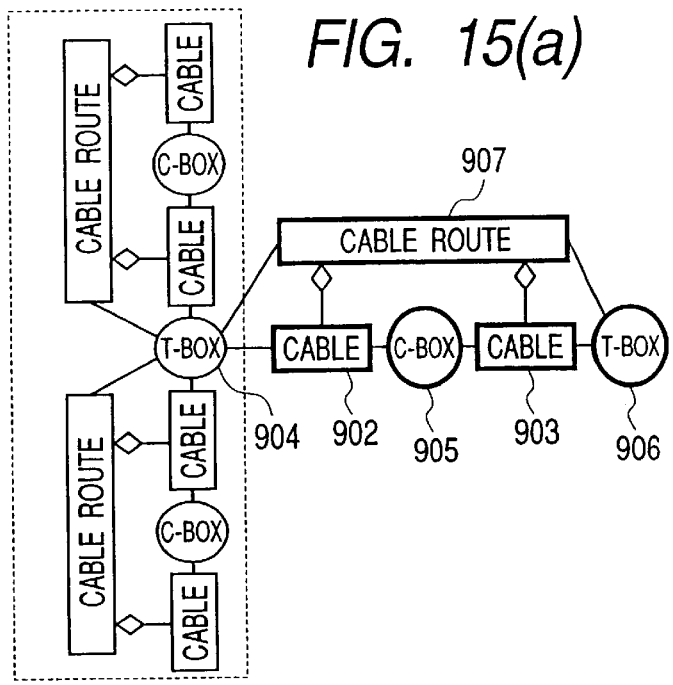
FIG. 15 is an explanatory diagram of STEP 3 indicated in FIG. 3.
Figure 15B:
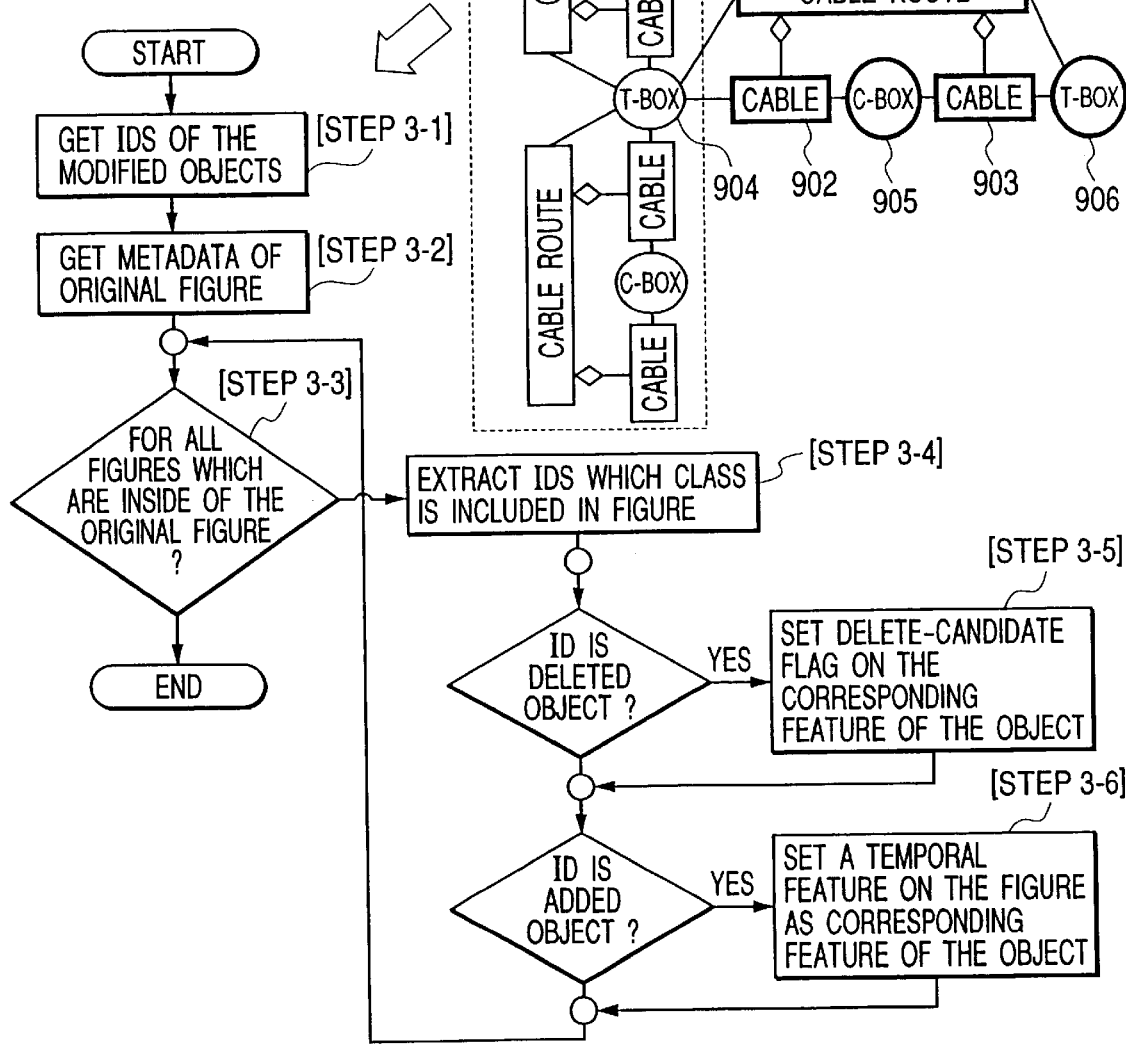
Figure 15C:
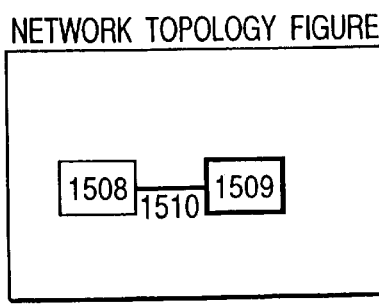
Figure 15D:
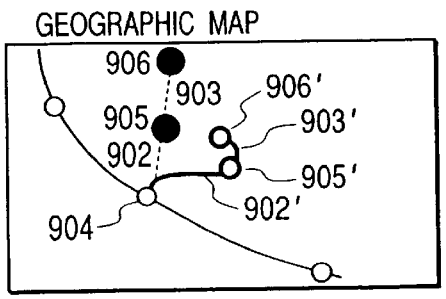
Figure 16:
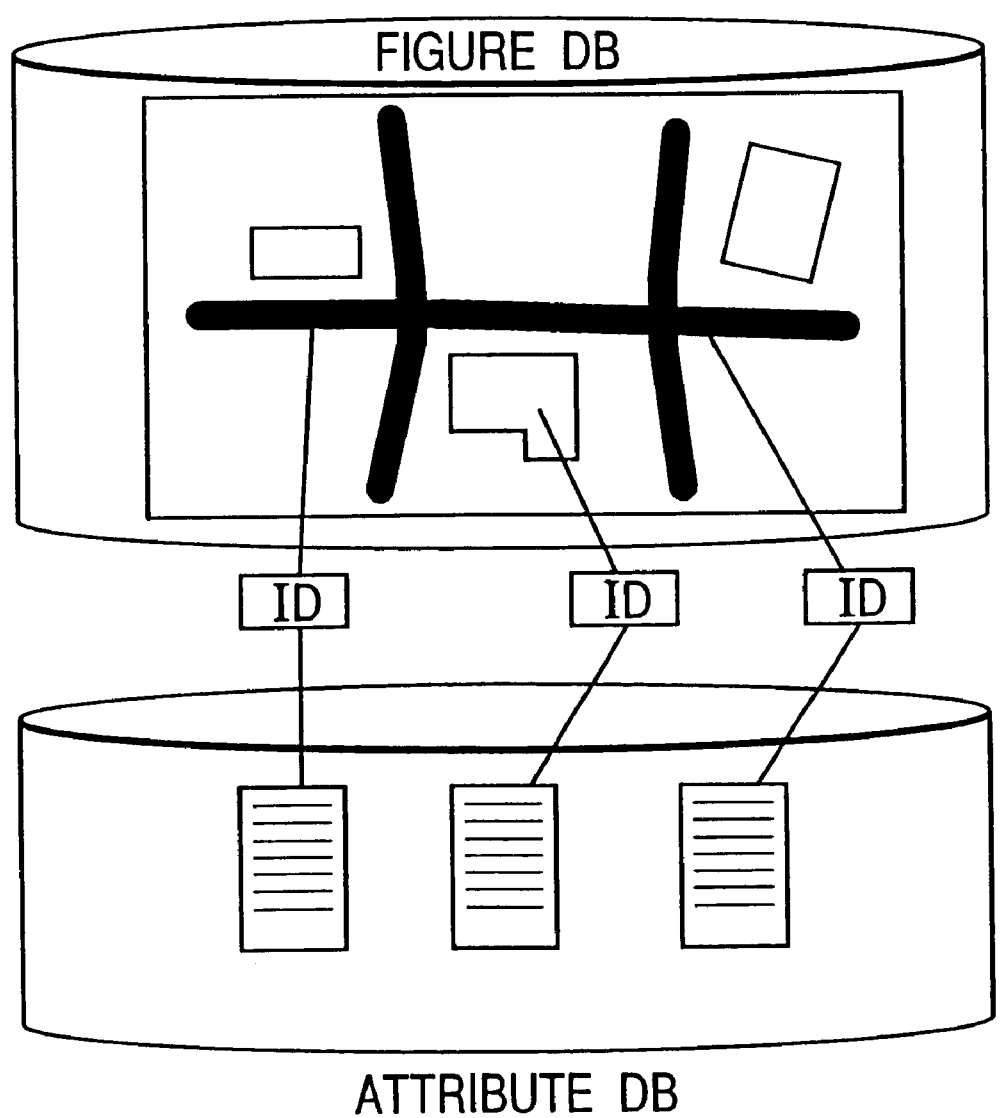
FIG. 16 is a schematic diagram showing a configuration of a conventional geographic information system.
Figure 17:
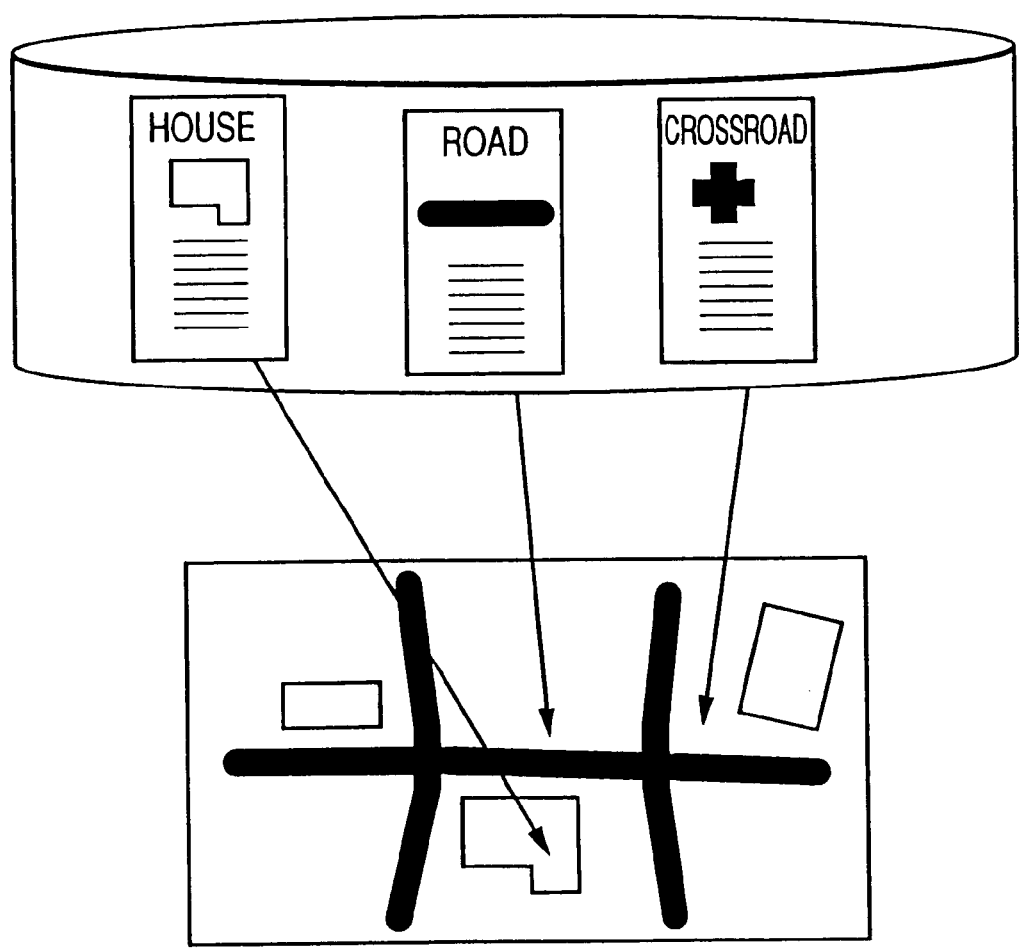
FIG. 17 is a schematic diagram showing a configuration of another conventional geographic information system.

Referring to FIG. 14, there is shown a detailed flowchart of processing with the attribute automatic modifying method function indicated at STEP 2 in FIG. 3.

STEP 2-1:

An ID list concerning the features renewed due to creation, editing or deletion by the user is attained. For the figure 901 containing newly added features, new object attribute data is registered in the attribute DB. According to a layer number of each renewed feature, the kind of feature is checked to determine an object class.

STEP 2-2:

In case that the input figure is a map, positions of features on the figure are significant. Therefore, a representative point of each renewed feature in terms of absolute coordinates (a centroid for a node feature, or a midpoint between end points for an arc feature) is registered as one of object attributes.

STEP 2-3:

An object connection relationship determined according to the connection condition rules shown in FIG. 12 is registered as one of object attributes.

STEP 2-4:

A connection relationship of an object connected with an object having an ID code attained at STEP 2-1 is modified correspondingly.

STEP 2-5:

For an object provided with an association relationship with an object having an ID code attained at STEP 2-1, a connection relationship thereof is modified correspondingly (STEP 2-6). If an object which must be in association relationship is not yet registered, temporary registration is made therefor (STEP 2-7).

Referring to FIG. 15, there is shown an explanatory diagram of the figure automatic modifying method function indicated at STEP 3 in FIG. 3. FIG. 15 (*a*) indicates an example of an objection relationship attained at STEP 2, FIG. 15 (*b*) indicates a flowchart of processing at STEP 3, FIG. 15 (*c*) indicates a network topology figure, and FIG. 15 (*d*) indicates a geographic map.

STEP 3-1:

An ID list of objects created and modified by the attribute automatic modifying method function indicated at STEP 2 in FIG. 3 is attained.

STEP 3-2:

Metadata of each original figure is attained.

STEP 3-3:

For each figure containing a spatial region of the original figure in the figure DB, STEPS 3-4 and 3-5 are carried out.

STEP 3-4:

On each figure, an ID code corresponding to a candidate for a modified feature is extracted from the modified object ID codes attained at STEP 3-1. Using metadata of a candidate figure to be modified, a class list described for the figure of interest is acquired, and an ID code corresponding to each class is selected from an ID list of component objects. In each of the ID code formats 81, 82 and 83 shown in FIG. 8, class ID data is contained. Therefore, the above ID code selection can be carried out by comparing class ID values.

STEP 3-5:

A judgment is formed to check whether the object of interest is a deleted object or not. If it is a deleted object, a delete-candidate flag is set on a feature corresponding thereto.

STEP 3-6:

A judgment is formed to check whether the object of interest is an added object or not. If it is an added object, a temporary feature corresponding thereto is generated in the figure. An ID code is assigned to the temporary feature thus generated.

Later, the user can edit a position and shape of the temporary feature to make proper modification on the figure. In modification of the network topology figure (c) in which object position relationships are insignificant, the user may skip over a figure re-editing procedure.

In a special case of temporary feature position determination where both the original and modified figures are geographic maps (d), temporary features 902 to 906 can be set at accurate positions 902' to 906' by means of figure-to-figure scale conversion, reference point conversion, projection method conversion, etc., thereby eliminating the need for re-editing by the user. Thus, the relational attribute and figure modification can be accomplished.

While the present invention has been described in detail with respect to application to the geographic information system WAN, it is to be understood that the present invention is not limited by any of the details of description and that the present invention is also applicable to building internal wiring figure management, LAN management, trouble monitoring/diagnosis system management for LAN, and the like. Further, in the technical field of car navigation, the present invention is applicable to road network management, e.g., management of road maps and network topology figures for route checkup, management of plural maps having different scales, etc.

As set forth hereinabove and according to the present invention, it is possible to make cross reference among a plurality of related figures and efficiently utilize common objects repetitively appearing on the plural figures, attributes of the common objects, network connections, etc., thereby realizing enhancement in ease of figure management. Moreover, according to the present invention, a plurality of figures can be modified while maintaining mutual consistency through detection of possible discrepancy among the plural figures to decrease a workload imposed on figure modification by a human operator, thereby contributing to reduction in running and maintenance costs of a geographic information system.

While the present invention has been described above in conjunction with the preferred embodiments, one of ordinary skill in the art would be enabled by this disclosure to make various modifications to these embodiments and still be within the scope and spirit of the invention as defined in the appended claims.

What is claimed is:

1. A figure modifying method for use in a figure management system including topological figures, each indicating connection relationships between objects, concerning the same part to be managed are stored, said figure modifying method comprising:

a first step wherein, on input of a new topological figure concerning the same part to be managed into said figure management system, connection-association relationships between a first object and other objects thereon are compared with existent object attribute data indicating connection-association relationships with other objects, which have been stored in said figure management system, to perform examination for matching between each feature and object, and wherein an ID code common to said existent object attribute data is assigned to each matched feature on said new figure for establishing a relationship; and a second step wherein any feature not matched with said existent object attribute data in said first step is displayed as a discrepant point or a point to be renewed on display means, and then correction is performed on the discrepant point or the point to be renewed, wherein connection-association relationships indicates for each object which objects are connected to said object and for each object which objects are included in said object, and for which objects said object is included.

2. A figure modifying method for use in said figure management system as claimed in claim 1, wherein said first step includes input of an absolute position of said first object represented by a feature on said new figure.

3. A figure modifying method for use in said figure management system as claimed in claim 2, wherein, under condition that a previous version of said new figure has already been stored in said figure management system, examination for matching in said first step is carried out in a fashion that a position of an object represented by a feature on said new figure and connection-association relationships with other objects thereon are compared with existent data indicating a position of an object represented by each feature on said previous figure version and connection-association relationships with other objects thereon.

4. A figure modifying method for use in said figure management system as claimed in claim 3, further comprising:

a third step wherein, for modified features on a modified figure, a class of an object represented by each feature is extracted from a layer number thereof on an input figure, an absolute coordinate position of an object is extracted from an on-figure position of each feature, and a connection relationship with other objects is extracted from a connection relationship with other features for automatically generating, modifying and storing object attribute data.

5. A figure modifying method for use in said figure management system as claimed in claim 2, further comprising:

a third step wherein, for all the features on a newly prepared figure, a class of an object represented by each feature is extracted from a layer number thereof on an input figure, an absolute coordinate value of an object is extracted from an on-figure position of each feature, and a connection relationship with other objects is extracted from a connection relationship with other features for automatically generating, modifying and storing object attribute data.

6. A figure modifying method for use in said figure management system as claimed in claim 5, further comprising:

a fourth step wherein attribute data of an object having a connection relationship with any object corresponding to attribute data attained in said third step and attribute data of an object having an association relationship therewith are generated and modified correspondingly through automatic operation.

7. A figure modifying method for use in said figure management system as claimed in claim 5, wherein said third step is followed by a fourth step in which a topological figure is generated using object connection-association relationships and object attribute data corresponding to manually prepared object attribute data.

8. A figure modifying method for use in said figure management system as claimed in claim 5, wherein said third step is followed by a fourth step in which a topological figure is generated using object connection-association relationships and object attribute data corresponding to manually prepared object attribute data.

9. A figure modifying method for use in said figure management system as claimed in claim 2, wherein said figure management system is provided with a class list of objects represented on each related figure as attribute data of each related figure corresponding to an object modified using an input figure, and wherein there is provided a fourth step in which, after completion of said second step, an ID code included in said class list is extracted using an ID list of modified objects, the ID code thus extracted is compared with ID codes stored for features on each related figure, a mark of temporary change is added to each changed feature having the same ID code as that of a modified object, a mark of temporary deletion is added to each deleted feature having the same ID code of that of a modified object, a newly added feature which does not have the same ID code as that of any feature on each related figure is registered as a temporary feature maintaining an object connection relationship, and a feature to be modified correspondingly is output for display.

10. A figure modifying method for use in said figure management system as claimed in claim 9, wherein, in said fourth step, under condition that both of said input figure and each said related figure are geographic maps, a newly added feature is registered at an accurate position through reference point conversion, scale conversion and projection method conversion, and then each said related figure is modified correspondingly in automatic operation.

11. A figure modifying method for use in said figure management system as claimed in claim 1, wherein, in said first step, under condition that a plurality of input figures are given, a position of an object represented by a feature on a part of said input figures and connection relationships with other features thereon are compared with a position of an object represented by a feature on another part of said input figures, connection relationships with other features thereon, and connection relationships with objects having an association relationship with an object represented by a feature thereon, thereby detecting any possible discrepancy among a plurality of said input figures.

12. A figure modifying method for use in said figure management system as claimed in claim 1, wherein said figure management system is provided with a class list of objects represented on each related figure as attribute data of each related figure corresponding to an object modified using an input figure, and wherein there is provided a fourth step in which, after completion of said second step, an ID code included in said class list is extracted using an ID list of modified objects, the ID code thus extracted is compared with ID codes stored for features on each related figure, a mark of temporary change is added to each changed feature having the same ID code as that of a modified object, a mark of temporary deletion is added to each deleted feature having the same ID code of that of a modified object, a newly added feature which does not have the same ID code as that of any feature on each related figure is registered as a temporary feature maintaining an object connection relationship, and a feature to be modified correspondingly is output for display.

13. A figure modifying method for use in said figure management system as claimed in claim 1, wherein, under condition that a previous version of said new figure has already been stored in said figure management system, examination for matching in said first step is carried out in a fashion that a position of an object represented by a feature on said new figure and connection-association relationships with other objects thereon are compared with existent data indicating a position of an object represented by each feature on said previous figure version and connection-association relationships with other objects thereon.

14. A figure modifying method for use in said figure management system as claimed in claim 13, further comprising:
a third step wherein, for modified features on a modified figure, a class of an object represented by each feature is extracted from a layer number thereof on an input figure, an absolute coordinate position of an object is extracted from an on-figure position of each feature, and a connection relationship with other objects is extracted from a connection relationship with other features for automatically generating, modifying and storing object attribute data.

15. A figure modifying method for use in said figure management system as claimed in claim 1, further comprising:
a third step wherein, for all the features on a newly prepared figure, a class of an object represented by each feature is extracted from a layer number thereof on an input figure, an absolute coordinate value of an object is extracted from an on-figure position of each feature, and a connection relationship with other objects is extracted from a connection relationship with other features for automatically generating, modifying and storing object attribute data.

16. A figure modifying method for use in said figure management system as claimed in claim 15, further comprising:
a fourth step wherein attribute data of an object having a connection relationship with any object corresponding to attribute data attained in said third step and attribute data of an object having an association relationship therewith are generated and modified correspondingly through automatic operation.

17. A figure modifying method for use in said figure management system as claimed in claim 12, wherein, in said fourth step, under condition
that both of said input figure and each said related figure are geographic maps, a newly added feature is registered at an accurate position through reference point conversion, scale conversion and projection method conversion, and then each said related figure is modified correspondingly in automatic operation.

18. A figure management system, comprising:
a figure database for storing data of plural kinds of figures including topological figures, each indicating connection relationships between objects, concerning the same part to be managed;
an attribute database for storing attribute data of objects represented by features on said figures;
input and output devices for inputting and outputting figure data and attribute data; and
signal processing means for managing figure data and attribute data through use of said figure database, said attribute database, and said input and output devices;
wherein said signal processing means is arranged to include:
a first processing section for carrying out a feature-attribute matching function in which, on entry of an input topological figure into said figure management system, connection-association relationships with other objects are compared with existent object attribute data indicating connection-association relationships with other objects, which have been stored in said figure management system, to automatically perform examination for matching between each feature and object;
a second processing section for carrying out an attribute automatic modifying function in which object attribute data of any feature that has been judged to be a renewed feature by said first processing section is modified automatically; and
a third processing section for carrying out a figure automatic modifying function in which, using a feature and object attribute data on a figure modified through said first and second processing sections, object attribute data represented by each feature on plural kinds of figures concerning the same part to be managed in relation to said modified figure are modified correspondingly through automatic operation;

wherein connection-association relationships indicates for each object which objects are connected to said object and for each object which objects are included in said object, and for which objects said object is included.

19. A figure management system as claimed in claim 18, wherein there is further provided a figure automatic generating section for generating a topological figure using data of object positions and connection relationships with other objects stored in said figure database and said attribute database.

20. A figure management system as claimed in claim 18, wherein said signal processing means comprises a computer, and wherein said first, second and third processing sections are driven by an application program stored in data storage means connected with said computer.

21. A data storage medium containing an application program to be run on a computer, said application program controls a figure database for storing topological figures, each indicating connection relationships between objects, concerning the same part to be managed, and an attribute database for storing attribute data of objects represented by features on said figures, using input and output devices for inputting and outputting figure data and attribute data, wherein said application program is arranged to include:

a first step in which, on input of a new topological figure concerning the same part to be managed into said figure management system, connection-association relationships with other objects thereon are compared with existent object attribute data indicating object absolute positions and connection-association relationships with other objects, which have been stored in said figure management system, to perform examination for matching between each feature and object, and in which an ID code common to said existent object attribute data is assigned to each matched feature on said new figure;

a second step in which any feature not matched with said existent object attribute data in said first step is displayed as a discrepant point or a point to be renewed on display means provided by said input and output devices;

a third step in which attribute data of each object corresponding to a renewed feature on said input figure and attribute data of objects in relation to each said object are modified; and a fourth step in which features in relation to each object corresponding to said renewed feature are stored for related figures;

wherein connection-association relationships indicates for each object which objects are connected to said object and for each object which objects are included in said object, and for which objects said object is included.

22. A data storage medium as claimed in claim 21, wherein said first step includes input of an absolute position of said first object represented by a feature on said new figure.

23. A data storage medium as claimed in claim 22, wherein said first step of said application program comprises:

a first sub-step in which a judgment is formed to check whether an input figure is a map or a topological figure; and a second sub-step in which, if said input figure is judged to be a map, a representative point coordinate value of a feature is determined from a position thereof on said input figure, and said representative point coordinate value thus determined is converted to an absolute coordinate value using metadata of said input figure according to a reference point coordinate value, scale and projection method taken for said input figure;

whereby comparison is then carried out to perform feature-attribute matching.

24. A data storage medium as claimed in claim 22, wherein said first step of said application program comprises:

a first sub-step in which a judgment is formed to check whether an input figure is a map or a topological figure; and a second sub-step, if said input figure is judged to be a topological figure, a connection relationship of each feature on said input figure is attained using said input figure, and said connection relationship thus attained is stored into a table;

whereby, using said connection relationship stored in said table, comparison is then carried out to perform feature-attribute matching.

25. A data storage medium as claimed in claim 21, wherein said first step of said application program comprises:

a first sub-step in which a judgment is formed to check whether an input figure is a map or a topological figure; and a second sub-step in which, if said input figure is judged to be a map, a representative point coordinate value of a feature is determined from a position thereof on said input figure, and said representative point coordinate value thus determined is converted to an absolute coordinate value using metadata of said input figure according to a reference point coordinate value, scale and projection method taken for said input figure;

whereby comparison is then carried out to perform feature-attribute matching.

26. A data storage medium as claimed in claim 21, wherein said first step of said application program comprises:

a first sub-step in which a judgment is formed to check whether an input figure is a map or a topological figure; and a second sub-step, if said input figure is judged to be a topological figure, a connection relationship of each feature on said input figure is attained using said input figure, and said connection relationship thus attained is stored into a table;

whereby, using said connection relationship stored in said table, comparison is then carried out to perform feature-attribute matching.

* * * * *